United States Patent
Tian et al.

(10) Patent No.: US 12,543,988 B2
(45) Date of Patent: Feb. 10, 2026

(54) ADD-ON SOFT ELECTRONIC INTERFACES AND METHODS FOR FORMATION

(71) Applicant: The Texas A&M University System, College Station, TX (US)

(72) Inventors: Limei Tian, College Station, TX (US); Myeong Namkoong, College Station, TX (US)

(73) Assignee: The Texas A&M University System, College Station, TX (US)

( * ) Notice: Subject to any disclaimer, the term of this patent is extended or adjusted under 35 U.S.C. 154(b) by 264 days.

(21) Appl. No.: 18/239,306

(22) Filed: Aug. 29, 2023

(65) Prior Publication Data

US 2024/0081711 A1  Mar. 14, 2024

Related U.S. Application Data

(63) Continuation-in-part of application No. 18/278,763, filed as application No. PCT/US2022/018015 on Feb. 25, 2022.

(60) Provisional application No. 63/401,835, filed on Aug. 29, 2022, provisional application No. 63/154,703, filed on Feb. 27, 2021.

(51) Int. Cl.
*A61B 5/268* (2021.01)
*A61B 5/256* (2021.01)

(52) U.S. Cl.
CPC .............. *A61B 5/268* (2021.01); *A61B 5/256* (2021.01)

(58) Field of Classification Search
CPC ...... A61B 5/256; A61B 5/0295; A61B 5/6843
See application file for complete search history.

(56) References Cited

U.S. PATENT DOCUMENTS

| 2007/0299325 | A1* | 12/2007 | Farrell | A61B 5/0002 600/301 |
| 2018/0062044 | A1* | 3/2018 | Kim | H10K 85/1135 |
| 2020/0337569 | A1* | 10/2020 | Tauban | C08J 9/283 |
| 2020/0401042 | A1* | 12/2020 | Bao | G03F 7/093 |

FOREIGN PATENT DOCUMENTS

| EP | 3276693 A1 | 1/2018 | |
| KR | 20160081245 A * | 7/2016 | G01L 1/14 |
| WO | WO-9308732 A1 * | 5/1993 | A61B 5/25 |
| WO | WO-2022171861 A1 * | 8/2022 | A61B 5/6804 |

OTHER PUBLICATIONS

Liu, Y. et al.; "Ultrasmooth, highly conductive and transparent PEDOT:PSS/silver nanowire composite electrode for flexible organic light-emitting devices"; Organic Electronics, vol. 31, Feb. 5, 2016; pp. 247-252.
Fang, Y. et al.; "Solution-Processed Submicron Free-Standing, Conformal, Transparent, Breathable Epidermal Electrodes"; ACS Appl. Mater. Interfaces. Journal, May 4, 2020; pp. 23689-23696.

* cited by examiner

*Primary Examiner* — Eun Hwa Kim
(74) *Attorney, Agent, or Firm* — Jackson Walker LLP

(57) ABSTRACT

A flexible electrode includes a layer of an interpenetrating network of silver nanowires and poly(3,4-ethylenedioxythiophene):poly(styrenesulfonate) (PEDOT:PSS), and a core comprising a foam. The layer of interpenetrating network of silver nanowires and PEDOT:PSS are wrapped around the core. A wearable device includes a current source comprising a pair of outer electrodes, and voltage sensors comprising one or two pairs of internal electrodes that are arranged between the outer electrodes. At least one electrode of these electrodes is a flexible electrode.

20 Claims, 21 Drawing Sheets

NANOCOMPOSITE

PEDOT:PSS ONLY

FILL FACTOR 30%

FILL FACTOR 50%

FILL FACTOR 70%

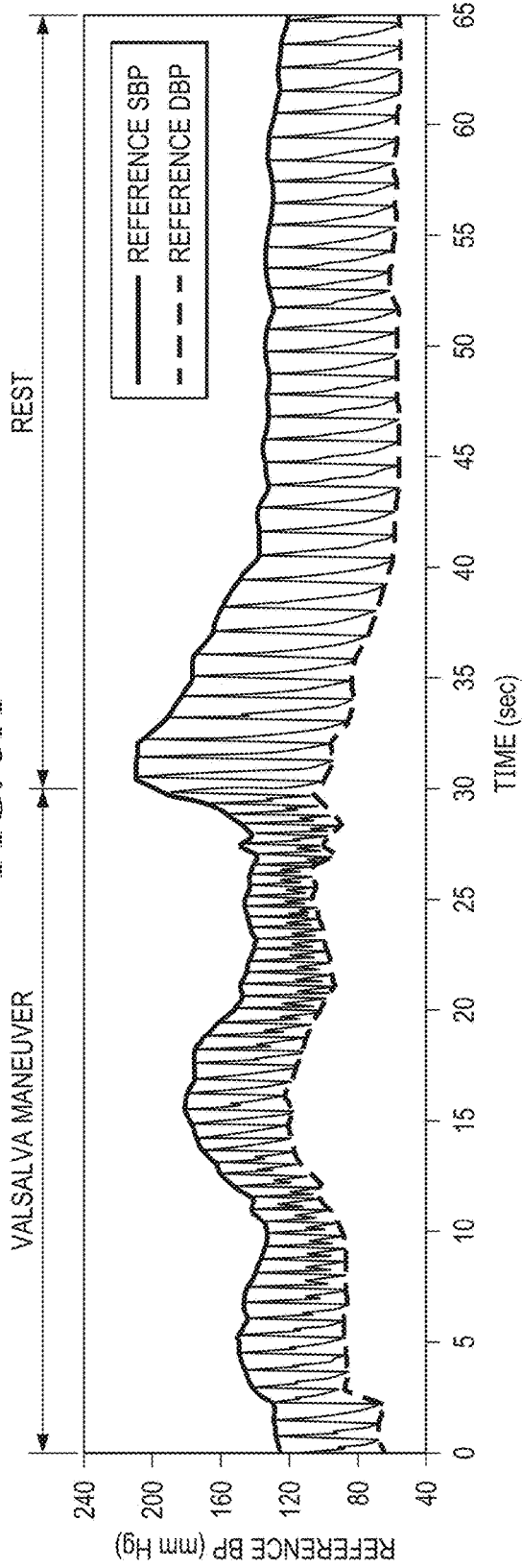
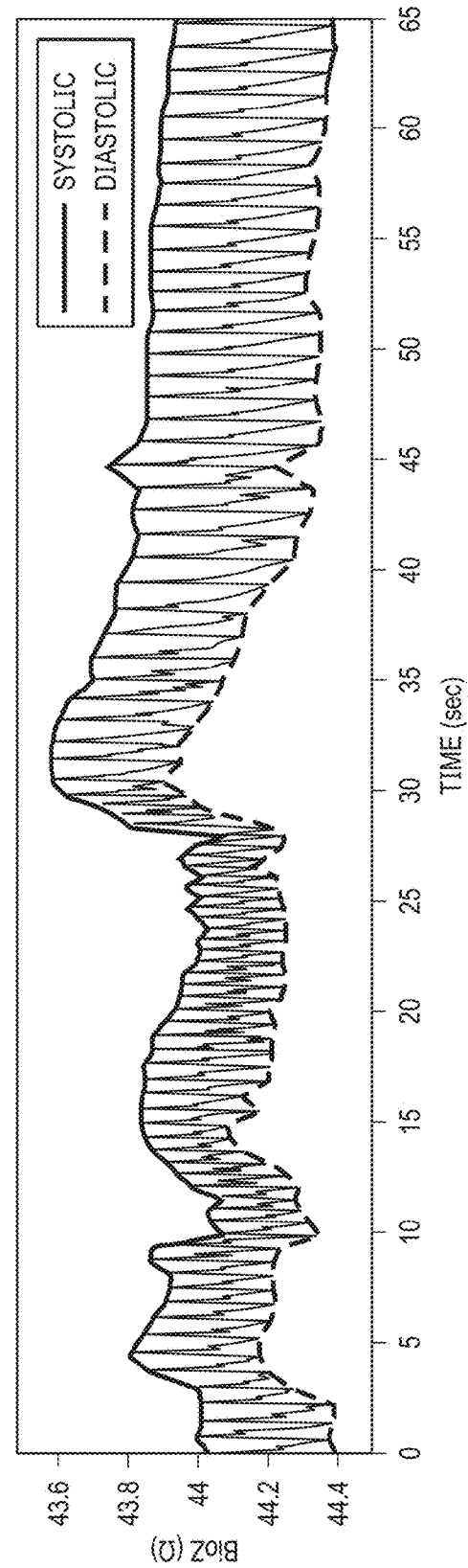
FIG. 5A.
FIG. 5B

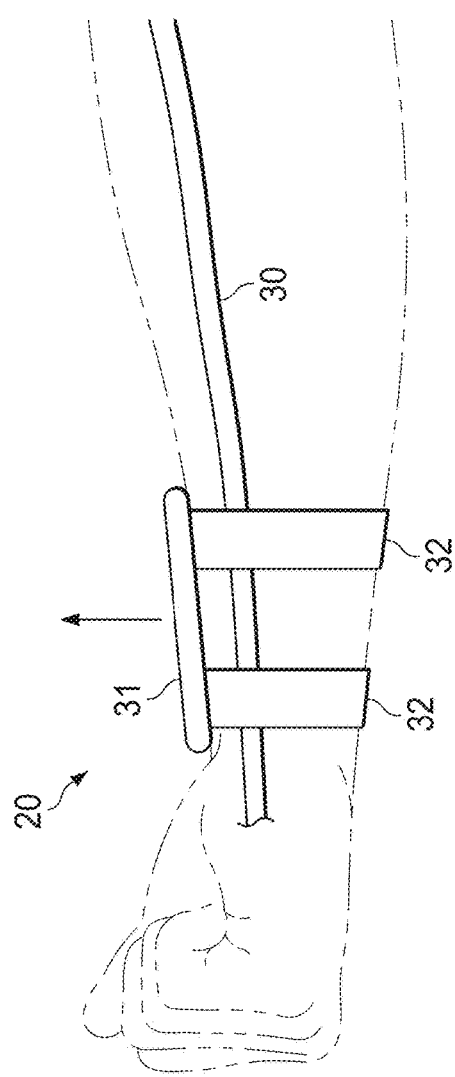
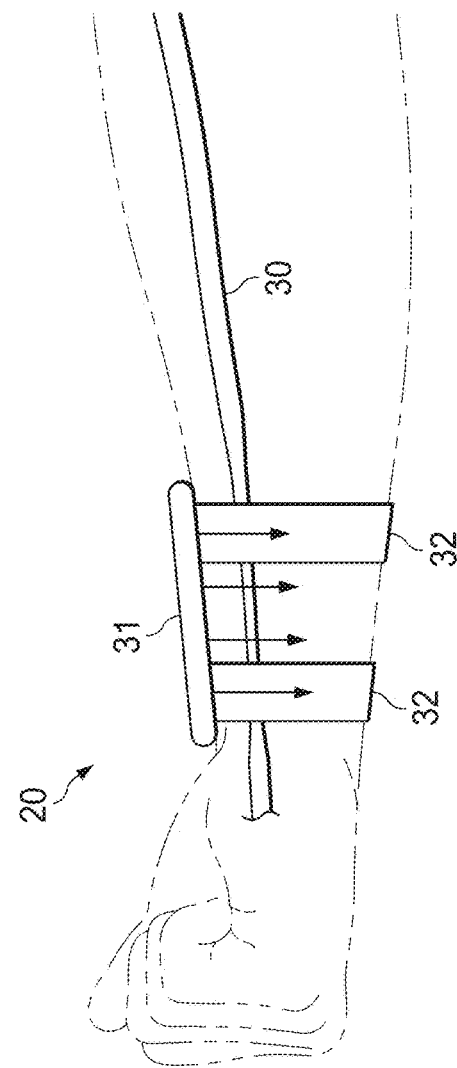

ADD-ON SOFT ELECTRONIC INTERFACES AND METHODS FOR FORMATION

CROSS-REFERENCE TO RELATED APPLICATIONS

This patent application is a continuation in part of U.S. application Ser. No. 18/278,763, which is a US National Stage application of PCT/US2022/018015 filed Feb. 25, 2022, which claims priority to U.S. Provisional Application Ser. No. 63/154,703 filed Feb. 27, 2021. This patent application claims priority to, and incorporates by reference the entire disclosure of, U.S. Provisional Application No. 63/401,835 filed on Aug. 29, 2022.

STATEMENT REGARDING FEDERALLY SPONSORED RESEARCH

This invention was made with government support under Grant No. 1648451 awarded by National Science Foundation. The government has certain rights in the invention.

TECHNICAL FIELD

The present disclosure relates generally to electrodes and more particularly, but not by way of limitation to, nanocomposite electrodes that can be applied to either soft or rigid surfaces while showing higher signal-to-noise ratio. The electrodes may be used for, for example, monitoring of blood pressure.

BACKGROUND OF THE INVENTION

This section provides background information to facilitate a better understanding of the various aspects of the disclosure. It should be understood that the statements in this section of this document are to be read in this light, and not as admissions of prior art.

Blood pressure (BP) monitoring is one of the most common clinical practices for the diagnosis, prognosis, and management of cardiovascular diseases. Hypertension, elevated BP, is a major cause of premature death worldwide and the leading cause of cardiovascular mortality. Hypertension increases the risk of many serious medical conditions, including heart attack, stroke, peripheral vascular disease, kidney failure, and other diseases. Hypertension is often diagnosed by quantifying BP with a cuff sphygmomanometer in clinical settings. The inflatable cuff that temporarily collapses and then releases the artery in a controlled manner is used for BP quantification. Studies show that 24-hour ambulatory BP and night BP recordings improve hypertension diagnosis. However, these cuff-based approaches have limitations in patient comfort and cannot provide continuous BP monitoring during sleep and for the long term. Recently, several types of wearable sensors have shown promise in continuous cuffless beat-by-beat monitoring of blood pressure with minimal stress on users. Photoplethysmography (PPG) is simple and low-cost, but has a limited penetration depth into the tissue of a few millimeters, making it difficult to capture blood volume changes from several arterial locations. Piezoresistive and piezocapacitive sensors are low-cost and user-friendly. However, these passive pressure sensors are not ideal for obese subjects as a thick fat layer greatly dampens pulse wave propagation to the skin surface. Wearable ultrasonic phased arrays enable the real-time recording of blood flow waveforms from deep tissues centimeters below the skin surface. Although promising, a benchtop ultrasonic pulser at 100 V to drive the wearable arrays and a picoscope used to receive the signal would need to be designed and reduced to a wearable form factor. Graphene bioimpedance sensors showed the capability of continuously monitoring arterial blood pressure owing to the deep penetration depth of electrical current. However, these devices rely on high-cost materials and fabrications. Overall, cuffless, continuous blood pressure monitoring with low-cost, user-friendly, and active sensing technology remains challenging.

Soft wearable devices offer the capability to continuously monitor a wide range of physiological parameters, providing physical and chemical information relevant to the health and disease status of individuals. In electrophysiological recordings, the design of electrodes is critical to obtain high-quality signals and minimize motion artifacts. Conventional gel electrodes fail to provide high signal quantity in continuous recordings because gel tends to dehydrate over time and increases the skin-electrode electrical impedance. Previous research focuses on developing dry electrodes with low-modulus conductive materials and/or engineering the structure of intrinsically rigid materials to overcome this challenge. Soft dry electrodes provide seamless interfaces between the human skin and the sensors, offering a signal-to-noise ratio comparable with gel electrodes. These dry electrodes were constructed with various materials, including ultrathin gold nanoribbons, nanowires, graphene, conductive polymers, and composites. Connecting these ultrathin soft electrodes to a data acquisition system often involves solder connection or thermal bonding of flexible anisotropic conductive film.

As wearable sensors undergo mechanical deformation, such as stretching and bending on the skin surface, these connectors are prone to mechanical damage. In addition, these connections require high-temperature bonding, which is impractical for their use outside labs. Thus, eliminating these connections in soft wearable electronic devices is important to achieve their robust operation in users' hands.

Pressure sensors are often used in medical applications. These sensors must remain in good contact with the skin. The soft form factor of sensors allows seamless interfaces between the human skin and the sensors and significantly enhances the signal-to-noise ratio. To achieve this, research has focused on the pattern of the electrodes and the material properties of the electrodes to match the skin properties. Conformal contact at the interface between these electrodes and the human skin is critical to obtain high quality signals minimizing motion artifacts. In this regard, understanding the electrodes mechanics, the skin mechanophysiology, and the characteristics of the combined abiotic-biotic system are critical to mitigate the mechanical mismatch at the interface. Moreover, the mismatch exists not only at the skin-electrodes interface, but also at the electrodes-monitoring unit interface, which is usually achieved by soldering of rigid electrical wires or via anisotropic conductive film (ACF). These methods degrade signal quality, and as this connection requires high temperature and pressure for bonding, it is impractical for the connectors to be used outside of labs. Thus, there is a need to change the electronics from hard, rigid, planar to soft, stretchable, tissue-like. Such tissue-like devices, implemented with biocompatible materials, will provide solutions to long-term monitoring with high levels of functionality.

However, flexible sensors still require rigid connectors such as electrical wires and ACF. Although these types of wiring are bendable, they are not as stretchable as the electrodes. Thus, there is a mechanical mismatch of soft electronics and its connectors. Furthermore, these types of connections are impractical outside of the labs. The stand-alone nanocomposite electrodes of the present invention do not require any rigid wiring for connection and can be adapted for use on soft or rigid surface and display higher signal-to-noise ratio compared to prior art devices.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter.

In some aspects, a flexible electrode includes a layer of an interpenetrating network of silver nanowires and poly(3,4-ethylenedioxythiophene):poly(styrenesulfonate) (PEDOT:PSS) and a core comprising a foam. The layer of interpenetrating network of silver nanowires and PEDOT:PSS are wrapped around the core.

In some aspects, a fill factor of the flexible electrode is between about 65-75%. In some aspects, a fill factor of the flexible electrode is greater than 50%.

In some aspects, the water vapor transmission rate (WVTR) is about 15-17 gm−2h$^{-1}$.

In some aspects, the layer of interpenetrating network of silver nanowires and PEDOT:PSS is adhered to the core via an adhesive.

In some aspects, the foam has a Young's modulus of about 1.5-1.7 kPa. In some aspects, the foam has a Young's modulus of less than 1 MPa.

In some aspects, the foam is styrene butadiene rubber (SBS).

In some aspects, the PEDOT:PSS comprises 2-[4-(2,4,4-trimethylpentan-2-yl)phenoxy]ethanol and D-sorbitol.

In some aspects, the electrodes are reusable.

In some aspects, a wearable device includes a current source comprising first and second electrodes and a first voltage sensor comprising third and fourth electrodes that are arranged between the first and second electrodes. At least one electrode of the first, second, third, and fourth electrodes is a flexible electrode that includes a layer of an interpenetrating network of silver nanowires and poly(3,4-ethylenedioxythiophene):poly(styrenesulfonate) (PEDOT:PSS), and a core comprising a foam. The layer of interpenetrating network of silver nanowires and PEDOT:PSS are wrapped around the core.

In some aspects, the current source is configured to inject alternating current into a radial artery via the first and second electrodes.

In some aspects, the alternating current is between about 350 and 450 µA at a frequency between about 45-55 kHz.

In some aspects, the wearable device is configured to measure voltage via the third and fourth electrodes and convert the voltage into impedance.

In some aspects, the wearable device is configured to quantify blood pressure using the impedance.

In some aspects, the wearable device further includes a pressure sensor configured to measure pressure exerted by the wearable device upon a wrist of a wearer.

In some aspects, the pressure sensor is a piezoelectric pressure sensor.

In some aspects, the foam has a Young's modulus of less than 1 MPa.

In some aspects, the wearable device measures the pressure in real time.

In some aspects, the wearable device further includes a second voltage sensor comprising fifth and sixth electrodes that are arranged between the first and second electrodes, wherein the fifth and sixth electrodes are flexible electrodes.

BRIEF DESCRIPTION OF THE DRAWINGS

A more complete understanding of the subject matter of the present disclosure may be obtained by reference to the following Detailed Description when taken in conjunction with the accompanying Drawings wherein:

FIGS. 4(C)-4(D) are graphs of base bioimpedance and its first derivative measured for liquid gel electrodes on the same PCB platform the add-on electrodes were measured on.

FIG. 5(A) is a graph of blood pressures and waveforms collected using a reference blood pressure monitor. FIG. 5(B) is a graph of inverted base bioimpedance measured using the add-on electrodes.

FIG. 6(A) systolic blood pressure (SBP), FIG. 6(B) diastolic blood pressure (DBP) calibration curves; correlation between the reference and bioimpedance quantified FIG. 6(C) and SBP and FIG. 6(D) DBP; error estimation of continuously quantified FIG. 6(E) SBP and FIG. 6(F) DBP.

FIGS. 7(B)-7(D) illustrate a wearable device having a pair of piezoelectric pressure sensors configured to quantify a contact pressure between the skin and electrodes.

DETAILED DESCRIPTION

Figure 1A:
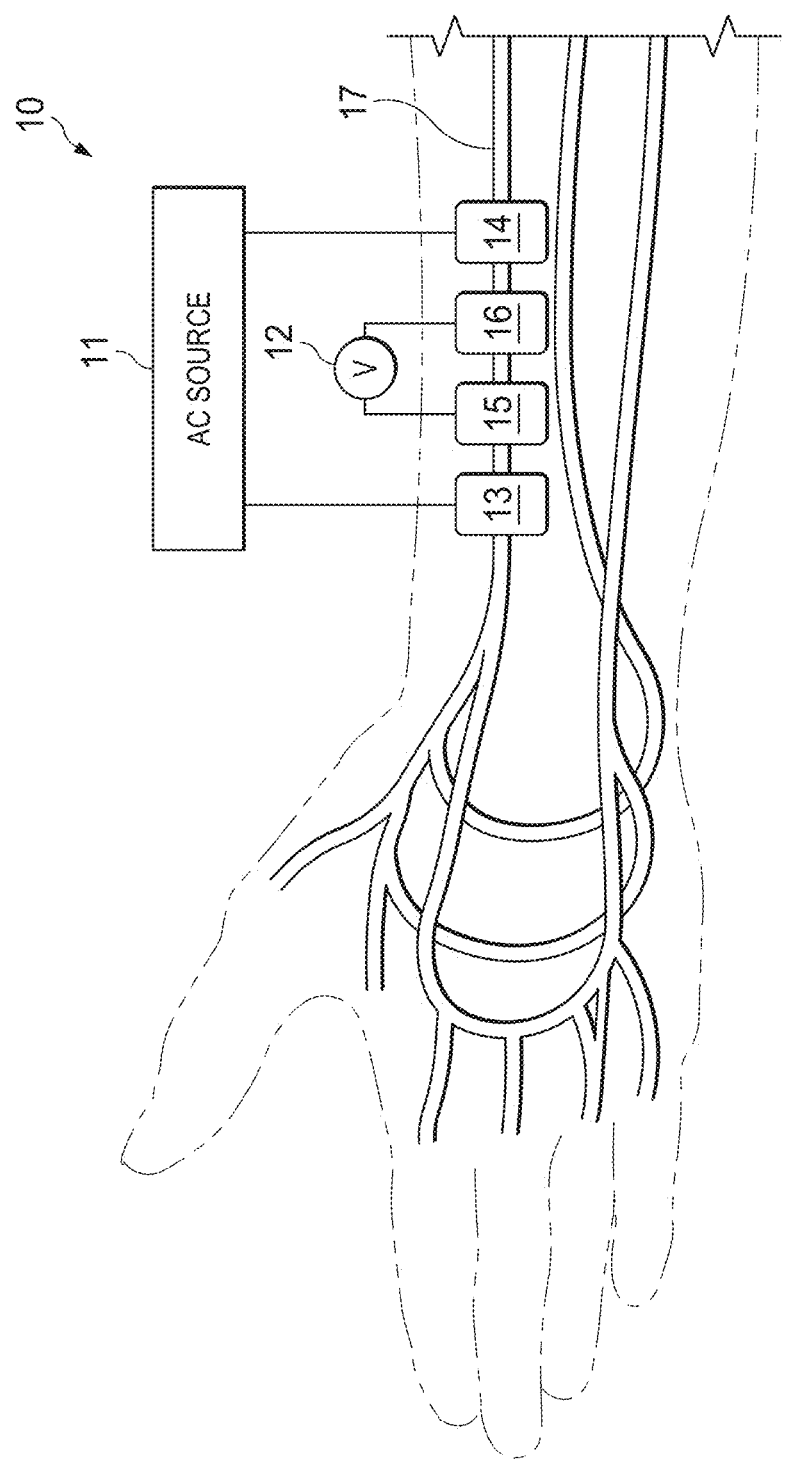
FIG. 1(A) is a schematic illustration of a bioimpedance measurement device positioned proximal to a radial artery.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described. Reference will now be made to more specific embodiments of the present disclosure and data that provides support for such embodiments. However, it should be noted that the disclosure below is for illustrative purposes only and is not intended to limit the scope of the claimed subject matter in any way.

Continuous monitoring of arterial blood pressure is clinically important for diagnosing and managing cardiovascular diseases. Soft electronic devices with skin-like properties show promise in various applications, including the human-machine interface, the Internet of Things, and health monitoring. Herein, the use of add-on soft electronic interfaces addresses the connection challenges between soft electrodes and rigid data acquisition circuitry for bioimpedance monitoring of cardiac signals, including heart rate and cuffless blood pressure is reported. Nanocomposite films in add-on electrodes provide robust electrical and mechanical contact with the skin and the rigid circuitry. Bioimpedance sensors composed of add-on electrodes offer continuous blood pressure monitoring with high accuracy. Specifically, the bioimpedance collected with add-on nanocomposite electrodes shows a signal-to-noise ratio of 37.0 dB, higher than the ratio of 25.9 dB obtained with standard silver/silver chloride (Ag/AgCl) gel electrodes. Although the sample set is low, the continuously measured systolic and diastolic blood pressure offer accuracy of −2.0±6.3 mmHg and −4.3±3.9 mmHg, respectively, confirming the grade A performance based on the IEEE standard. These results show promise in bioimpedance measurements with add-on soft electrodes for cuffless blood pressure monitoring.

An embodiment of the claimed invention is directed to the design of a standalone nanocomposite electrode. In certain embodiments, the electrodes are composed of an interpenetrating network of silver nanowires (AgNWs) and poly(3,4-ethylenedioxythiophene):poly(styrenesulfonate) (PEDOT:PSS) wrapped around soft and breathable foams. These materials display viscoelastic properties of the PEDOT:PSS on the top and bottom layers, and allow the electrodes to deform along the skin surface, while the middle AgNW layer provide high conductivity, providing excellent signal quality. Furthermore, the low modulus of the foam and the serpentine patterning of the electrodes adds onto the stretchability and helps match the properties of the skin. The standalone nanocomposite electrodes can be easily applied to either soft or rigid surfaces while showing higher signal-to-noise ratio in BioZ measurements compared to those collected with standard hydrogel or metal (Cu or Ag/AgCl) electrodes. In some aspects, the electrode comprises a soft conductive material, such as gold nanostructures, silver nanowires, silver microparticles, and poly(3,4-ethylenedioxythiophene):poly(styrenesulfonate) (PEDOT:PSS), and combinations thereof.

Pulse wave velocity (PWV) has been widely studied to extract cardiovascular information. PWV also provides a promising method for cuffless continuous blood pressure estimation. PWV measures the speed at which the arterial pulse propagates through the vasculature. It serves as an important indicator of arterial stiffness and vascular health. Elevated PWV values have been associated with an increased risk of cardiovascular events. Continuous monitoring of PWV allows for the early detection of arterial stiffness, which can aid in the timely implementation of interventions to prevent cardiovascular complications.

Continuous monitoring of blood pressure can help diagnose critical cardiovascular diseases (CVDs), such as cardiac arrest and hypertension, which otherwise can be overlooked. Therefore, such technique is crucial for prognosis, diagnosis, and prevention of various cardiovascular diseases. Current golden standard for blood pressure monitoring is unsuitable for continuous monitoring due to intermittent measurements and user discomfort. In this article, we introduce a wearable continuous blood pressure monitoring platform based on electrical bioimpedance (bioimpedance) with optimized injection current frequency and the pressure at the interface between the skin and electrodes. The blood pressure estimation resulted with the accuracy of 0.074±3.34 mmHg for systolic BP (SBP), 1.28±3.67 mmHg for diastolic BP (DBP), and −0.38±3.04 mmHg for mean arterial pressure (MAP). These results collectively quantify for the grade A category of IEEE standard for wearable, cuffless blood pressure measuring devices.

Contact pressure exerted at the interface between skin and wearable devices plays a crucial role in obtaining the optimal signal quality and accuracy. Insufficient contact may result in signal loss or weak signal intensity, while excessive pressure can over-compress the underlying blood vessels, affecting blood flow and distorting the pressure pulse-associated waveforms. It is important to develop a wearable device with an integrated contact pressure sensor to evaluate such effect and facilitate accurate and reliable measurements in continuous BP monitoring.

We introduce a skin-interfaced bioimpedance device integrated with contact pressure sensors for continuous recordings of dual-channel bioimpedance, PWV, and BP. The contact pressure sensors provide real-time quantification of contact pressure between the bioimpedance device and the skin. Our studies reveal the effect of contact pressure on the bioimpedance magnitude and waveforms and PWV. The pulsatile bioimpedance magnitude reached the maximum when the contact pressure was close to the mean blood pressure of the subject. The PWV first increases and then decreases with increasing the contact pressure. With comfortable contact pressure for long-term wear, the PWV was employed to quantify the continuous BP monitoring with 15 seconds intervals for different postures, including sitting and lying down. The mean absolute error and standard deviation of the error of SBP, DBP, and MAP are qualified grade A classification according to the IEEE standard for wearable, cuffless blood pressure measuring devices.

Design and Application of Add-on Nanocomposites for Soft Wearables

Figure 1B:
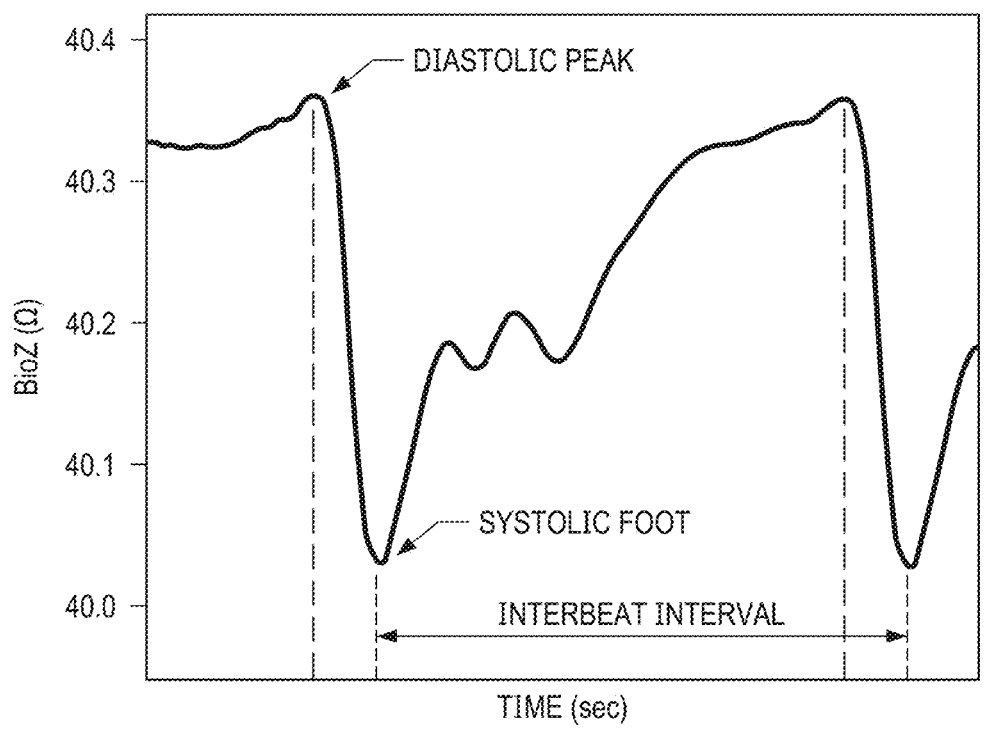
FIGS. 1(B) and 1(C) are graphs illustrating the correlation between bioimpedance and blood pressure waveforms.
Figure 1C:
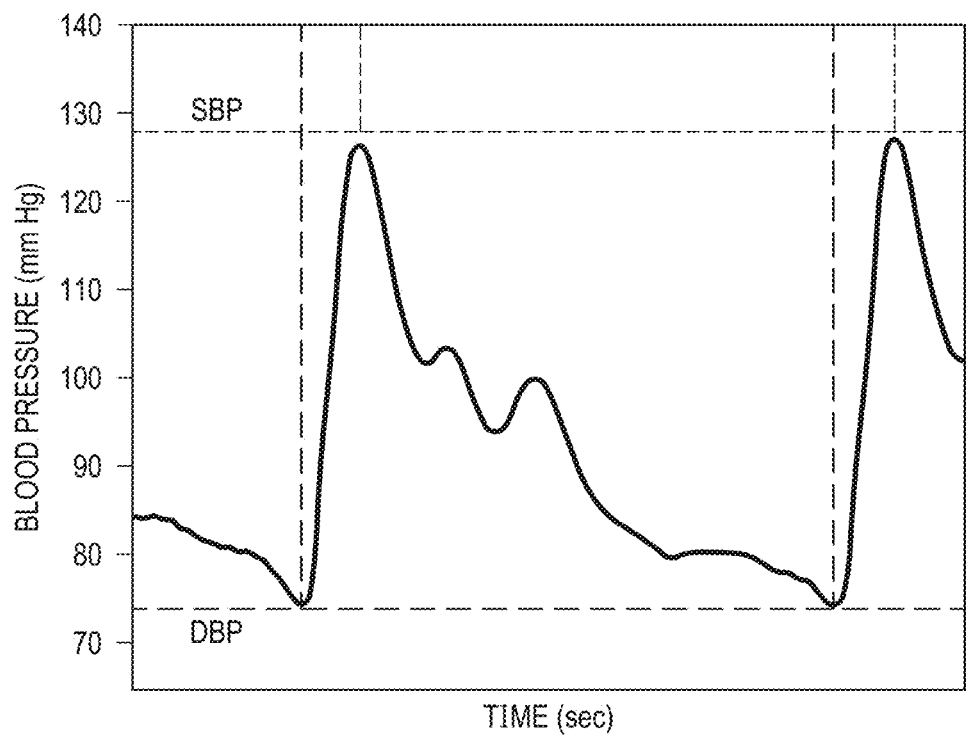

The quantification of blood pressure can be determined using a single-channel bioimpedance measurement device. FIG. 1(A) illustrates a single-channel bioimpedance measurement device 10 positioned proximal to a radial artery 17. Device 10 includes an AC source 11 and a voltage sensor 12. AC source 11 includes a pair of electrodes 13, 14 that are positioned on the skin of a person along a length of a radial artery 17. Voltage sensor 12 includes a pair of electrodes 15, 16 that are positioned along the length of the radial artery 17 and in between electrodes 13, 14. In a single-channel bioimpedance sensor, electrodes 13, 14 inject a small amount of alternating current (400 μA, frequency 50 kHz) into the underlying tissue, and electrodes 15, 16 measure the voltage and then convert it to impedance values. The four electrodes align with the radial artery on the wrist and measure the bioimpedance of the underlying tissue in the range of 10-100Ω. When blood travels through the radial artery, the bioimpedance changes follow the blood volume changes and reflect pulse pressure waves (FIGS. 1(B) and 1(C)). The pulsatile bioimpedance waveform can be calibrated to continuously quantify blood pressure, including DBP and SBP.

Figure 1D:
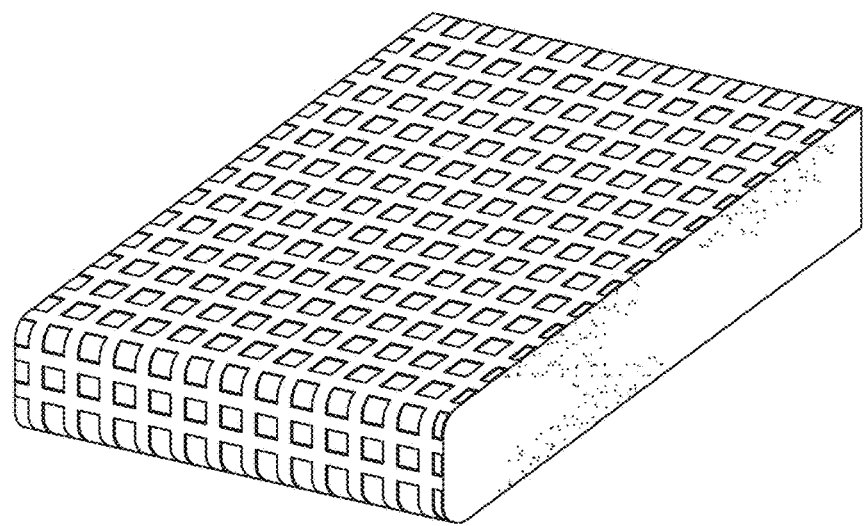
FIG. 1(D)-1(E) illustrate a soft, add-on electrode.
Figure 1E:
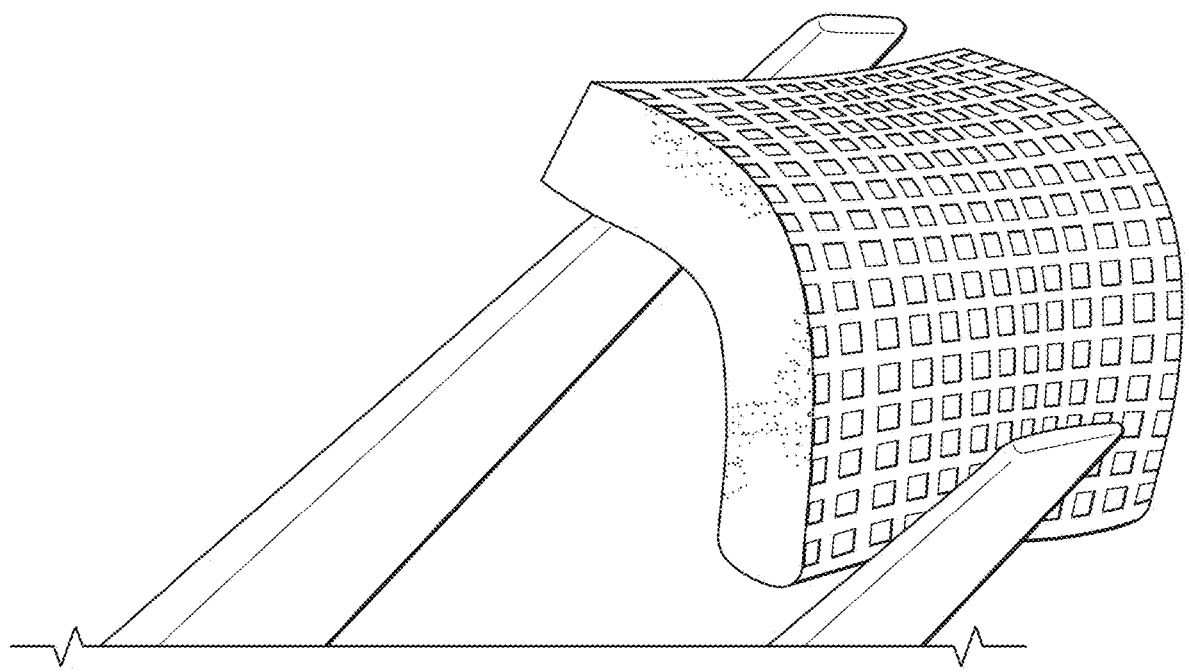

The instant disclosure describes improved, add-on soft electrodes (e.g., see FIGS. 1(D) and 1(E)) to establish a robust electronic interface to the skin and to the conductive components that connect to the data acquisition system. The add-on soft electrodes are nanocomposite electrodes composed of AgNW and PEDOT:PSS and fabricated via a simple, low-cost micromolding process. The micropatterned nanocomposite thin film is transferred onto a medical-grade adhesive and folded around soft, open-cell styrene butadiene rubber (SBS) foams. These electrodes are soft and flexible (e.g., see FIG. 1(E)). The Young's modulus of the foam was measured to be 1.6 kPa, much lower than the skin modulus of ≈1 Mpa. Combined with the serpentine pattern of the nanocomposite thin films, the foam's low modulus provides the add-on electrodes flexibility to accommodate the skin deformation and maintain seamless contact of electrodes to the skin. The mechanical properties of the PEDOT:PSS were tuned with additives, Triton X (2-[4-(2,4,4-trimethylpentan-2-yl)phenoxy]ethanol) and D-sorbitol, to achieve comparable modulus with skin. The viscoelastic properties of the PEDOT:PSS in the nanocomposite allows the conformal contact of electrodes to the skin and to the rigid conductive surface. The middle AgNW layer improves the conductivity and electromechanical stability of the nanocomposite. The nanocomposite films exhibit an 8% increase in the resistance under bending around the cylinder with a radius of 0.125 mm. The electromechanical stability ensures the negligible change in electrical properties of nanocomposite when the nanocomposite thin film folds around the soft foam and deforms during applications.

The nanocomposite electrodes include a uniformly distributed and interconnected network of AgNW. High breathability of skin-interfaced devices is desirable to mitigate skin irritation and inflammation risks for long-term wear. The breathability of the electrodes was assessed with the water vapor transmission rate (WVTR) of different substrates, including soft foam, electrodes on fabric adhesive, and add-on electrodes. The electrode on elastic nonwoven fabric medical tape (3M 9907W) shows a similar WVTR of 19.3 $gm^{-2}h^{-1}$ as the open case with a WVTR of 20.9 $gm^{-2}h^{-1}$. Compared to the open case, the soft foam reduces the WVTR by 18%, and the addon electrode reduces the WVTR by 27%, confirming the high breathability of the electrodes. In the following experiments, gold-plated copper (Au/Cu) pads with the dimension of 7 mm×12 mm were used on a printed circuit board as a surrogate surface to evaluate the performance of add-on electrodes for electrophysiological recordings. The electrodes were gently pressed to the gold surface for 5 s and allowed nanocomposite and adhesive to form robust bonding owing to their viscoelastic properties. The interface resistance between the electrode and the Au/Cu pad was measured to be ≈10Ω. Users can easily apply add-on electrodes to the rigid surface of wearable devices without involving high-temperature bonding processes.

Bioimpedance Measurements with Nanocomposite Electrodes

In the nanocomposite, AgNW is the main conductive material in the nanocomposite electrodes, and its density controls the conductivity of nanocomposites by affecting the electrical conductivity and electromechanical stability. To optimize and understand the role of AgNW, samples with different AgNW densities were compared.

Figure 2C:
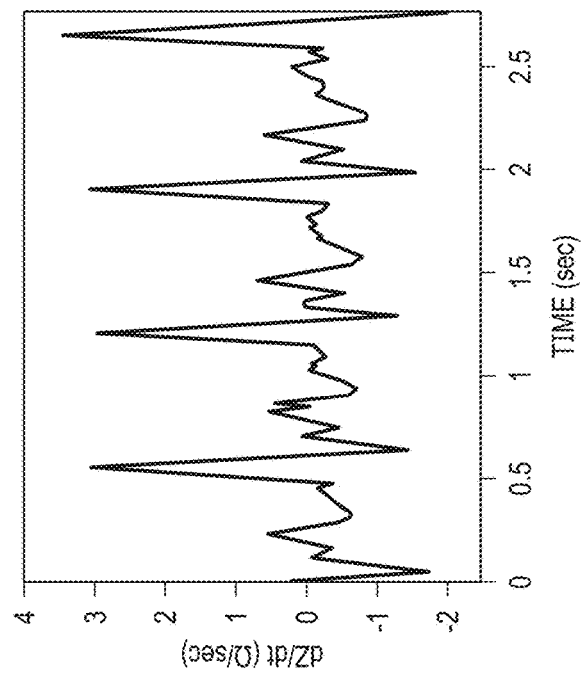
FIGS. 2(B)-2(C) and 2(E)-2(F) illustrate bioimpedance and its first derivative with respect to time measured with add-on electrodes made nanocomposite PEDOT:PSS only, respectively.
Figure 2A:
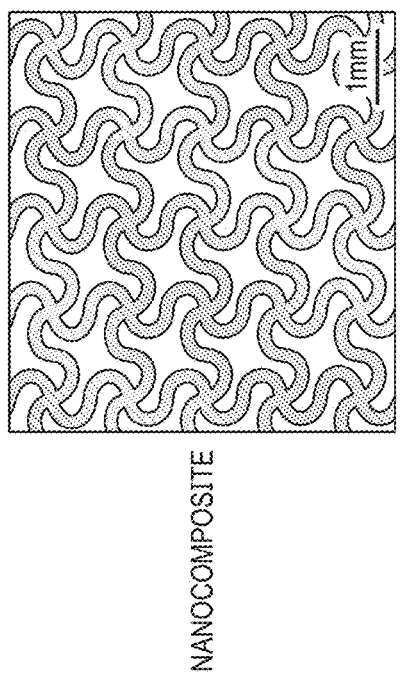
FIGS. 2(A) and 2(D) illustrate nanocomposite and PEDOT:PSS-only films, respectively, having serpentine patterns.
Figure 2B:
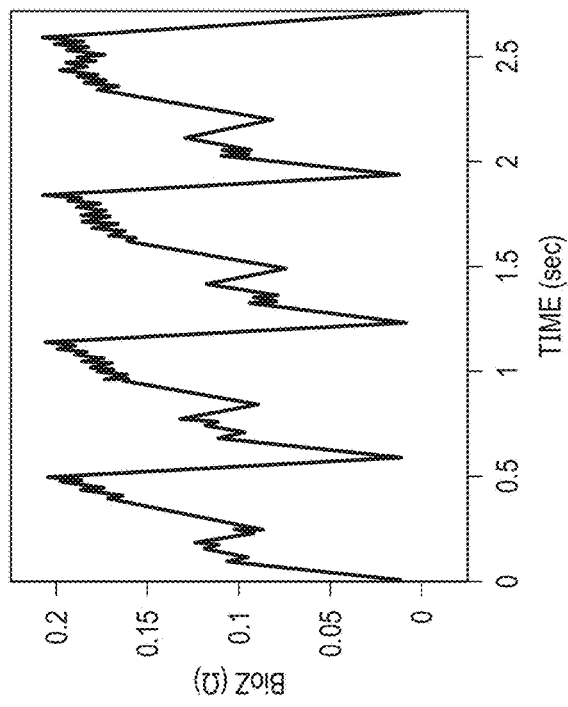
Figure 2F:
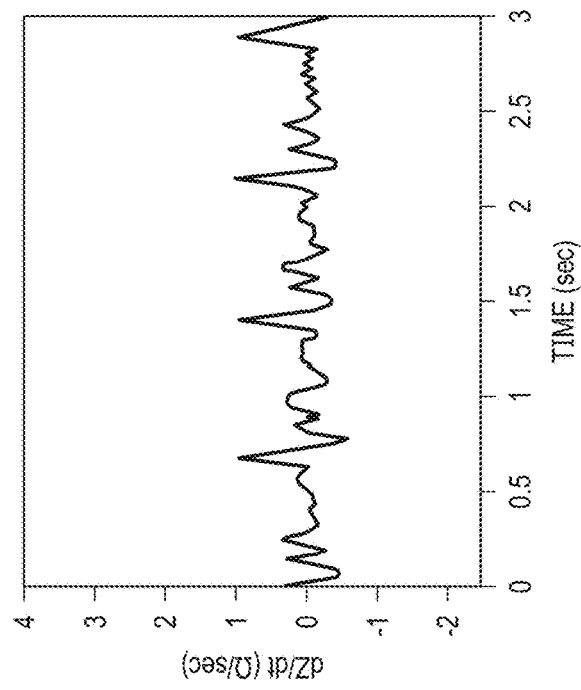
Figure 2D:
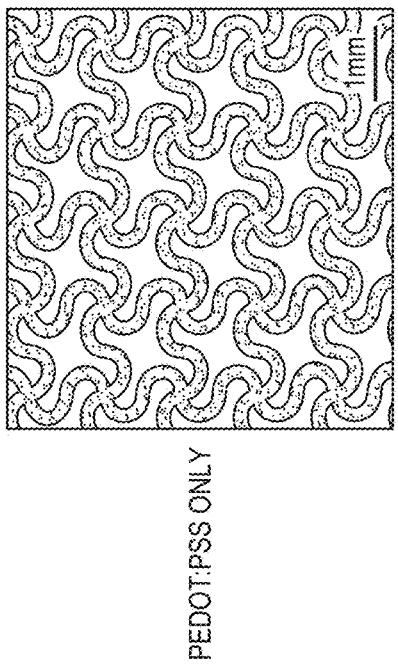
Figure 2E:
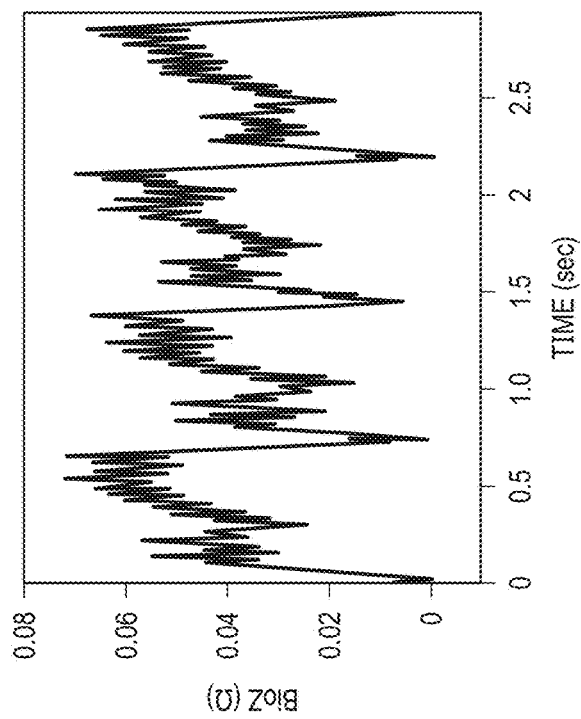

Four add-on nanocomposite electrodes with a dimension of 7 mm×12 mm and a center-to-center distance of 9 mm assembled on a printed circuit board to measure bioimpedance. First, the importance of AgNW in the nanocomposite for high-quality bioimpedance recordings was tested. We measured bioimpedance with nanocomposite electrodes and the electrodes without AgNW on the wrist of a healthy male subject to compare the signal-to-noise ratio. The nanocomposite film of serpentine pattern with a wire width of 150 μm and 50% fill factor (conductive area/electrode area) was fabricated to form add-on electrodes (FIG. 2(A)). The nanocomposite electrode appears silver-blue color resulting from a high density of AgNW. The electrode without AgNW exhibits a brighter blue color. The bioimpedance measured with nanocomposite electrodes was ≈67Ω. We removed the base impedance and used the peak-to-peak amplitude of pulsatile bioimpedance to compare the quality of signals collected with different electrodes (FIG. 2(D)). The bioimpedance collected with nanocomposite electrodes shows a peak-to-peak amplitude of 0.2Ω and signal-to-noise ratio of 37.0 dB, which is much higher than the peak-to-peak amplitude of 0.07Ω and the signal-to-noise ratio of 23.3 dB with PEDOT:PSS electrodes (FIGS. 2(C), 2(D)). In addition, the first derivative of the bioimpedance with respect to time (dZ/dt) was calculated and converted to positive polarity for comparison. Basic hemodynamic parameters, such as stroke volume and cardiac output, can potentially be quantified with dZ/dt. The peak-to-peak amplitude of dZ/dt with nanocomposite electrodes is 4.5 $Ωs^{-1}$, 3 times larger than that measured with PEDOT:PSS electrodes. The higher signal-to-noise ratio offered by nanocomposite electrodes follows the lower skin-electrode interface impedance than PEDOT:PSS electrodes. After 10 min of continuous measurements with nanocomposite electrodes, the signal-to-noise ratio of the bioimpedance and its first derivative remain comparable to the initial values. These results confirm that the AgNW in the nanocomposite significantly improves the bioimpedance signal-to-noise ratio due to its much higher conductivity than PEDOT:PSS.

The effective conductive area in individual nanocomposite electrodes plays an important role in pulsatile bioimpedance sensitivity. We define a fill factor as the effective conductive area (nanocomposite surface area) divided by the total electrode area. We measured the bioimpedance with the add-on electrodes with varying fill factors of 30%, 50%, and 70% (FIGS. 3(A), 3(D), and 3(G)). All four electrodes used in each measurement have the same fill factor. The peak-to-peak amplitude of the pulsatile bioimpedance increases from 0.15Ω to 0.28Ω with increasing fill factors from 30% to 70% (FIGS. 3(D), 3(E), and 3(H)). The signal-to-noise ratios of bioimpedance collected with 30%, 50%, and 70% fill factor electrodes are quantified to 31.4 dB, 33.9 dB, and 37.0 dB, respectively. The bioimpedance waveforms collected with 50% and 70% fill factor electrodes exhibit more discernable peaks (percussion, tidal, and dicrotic waves) compared to that of 30% fill factor electrodes. Furthermore, the dZ/dt obtained from the 70% electrodes exhibits a peak-to-peak amplitude of 7 $Ωs^{-1}$, much higher than 30% and 50% fill factor electrodes. Collectively, these results show that bioimpedance signal quality increases with an increased fill factor of electrodes. We further tested the reusability of the 70% fill factor electrodes. The device with four electrodes was removed from the skin after continuous measurements of bioimpedance for 5 min (one cycle) and then reapplied to measure bioimpedance for another cycle. The electrodes were reapplied 20 times, and the signal-tonoise ratio remains consistent and confirms the reusability of nanocomposite electrodes for bioimpedance measurements.

Comparison with Conventional Electrodes

Figure 4A:
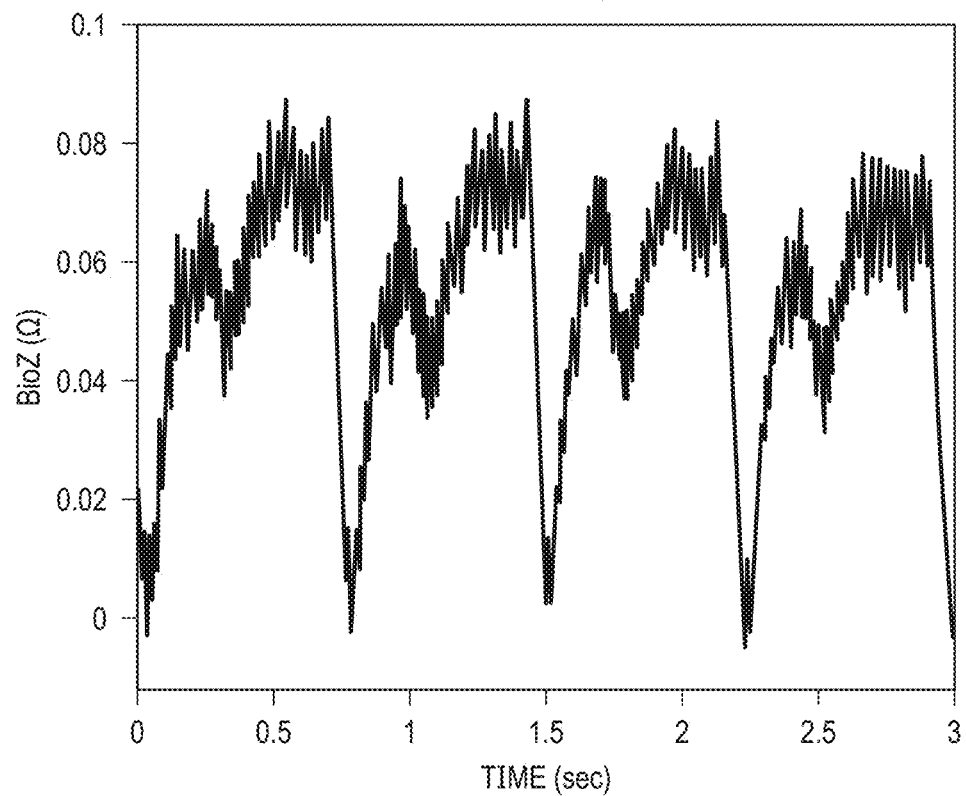
FIGS. 4(A)-4(B) are graphs of base bioimpedance and its first derivative measured for commercial Ag/AgCl gel electrodes.
Figure 4B:
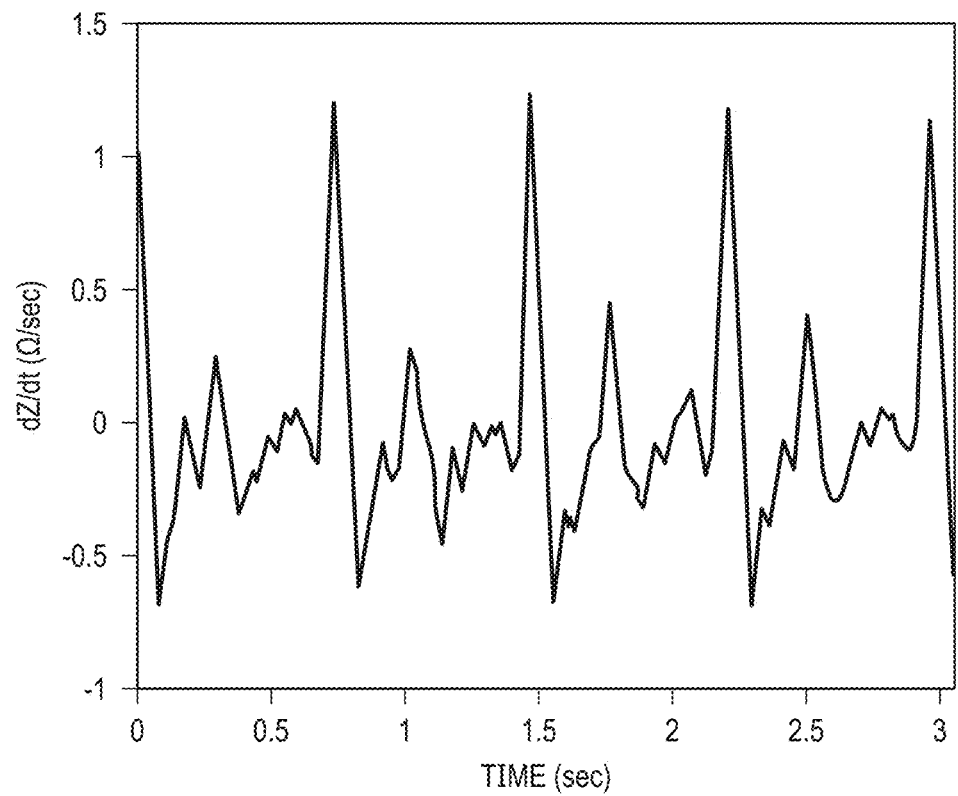
Figure 4C:
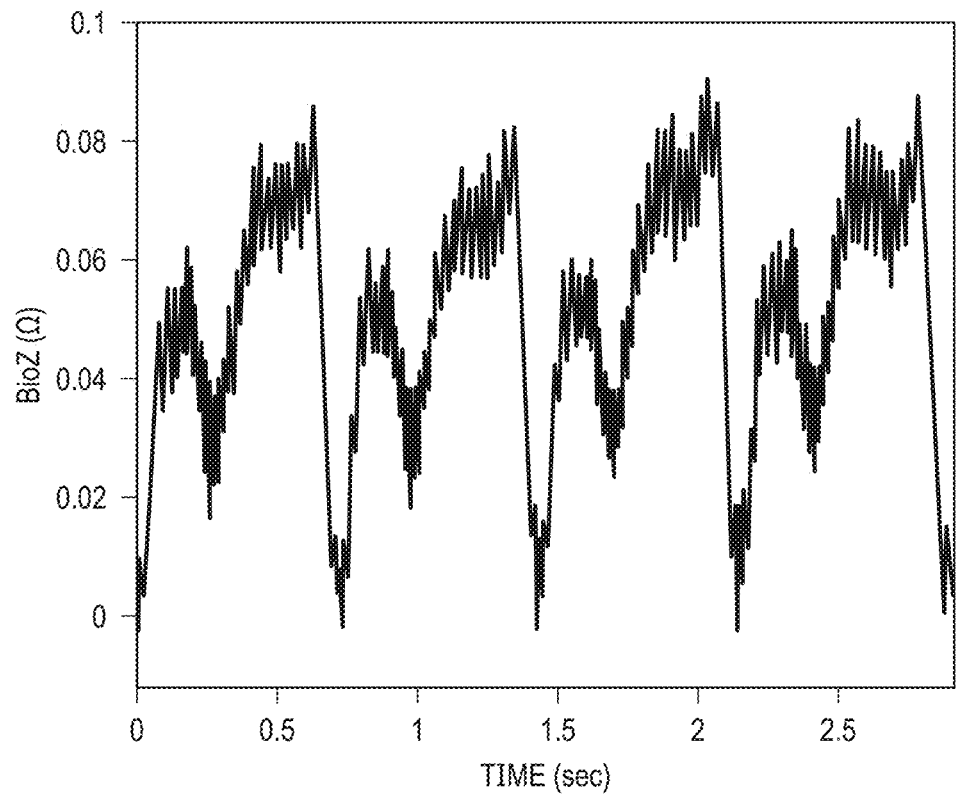
Figure 4D:
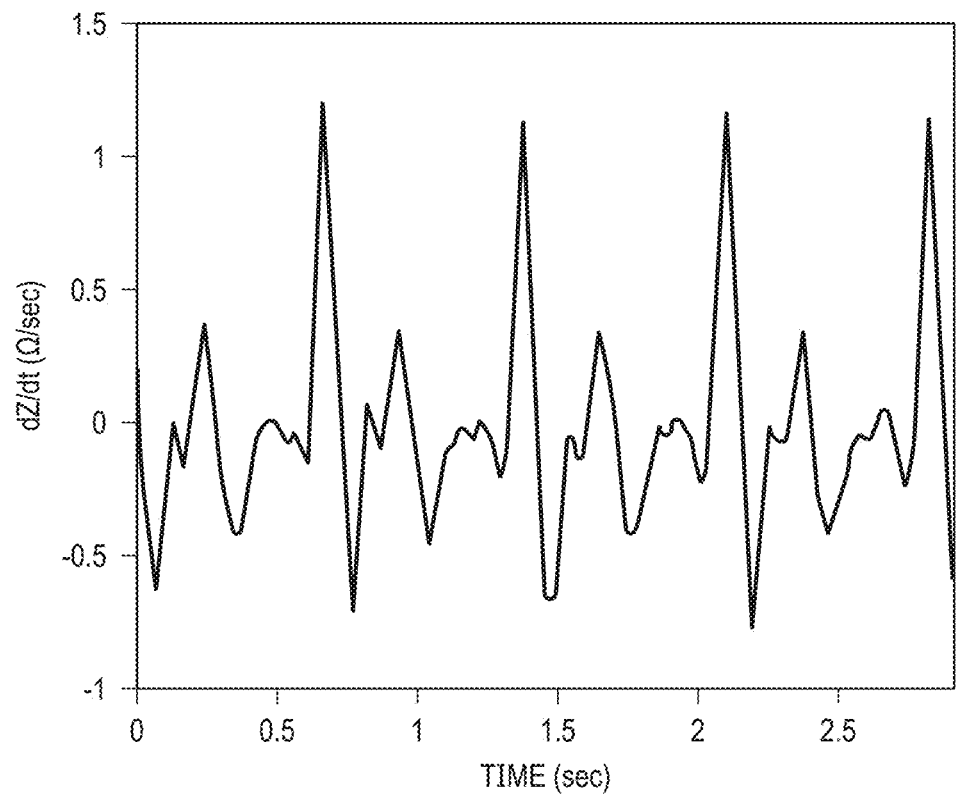

We compared the performance of add-on nanocomposite electrodes with conductive metal pads with and without conductive gels and conventional Ag/AgCl gel electrodes for bioimpedance measurements. All electrodes used in the comparison have the same electrode area defined within the conductive boundary. The bioimpedance collected with conventional Ag/AgCl gel electrodes shows a peak-to-peak amplitude of 0.08Ω, a signal-to-noise ratio of 25.9 dB, and dZ/dt of 1.5Ω s$^{-1}$, much lower than nanocomposite electrodes (FIG. 4(A)). With the same experimental setup, the Au/Cu planar electrodes without add-on nanocomposite components exhibit a much lower signal to-noise ratio of 11.0 dB and dZ/dt of 1.1 Ωs$^{-1}$. Adding a liquid or solid gel layer on the gold surface can improve the signal quality. The Au/Cu planar electrodes with liquid gels provided a signal-to-noise ratio of 20.6 dB (FIG. 4(A)), and the electrodes with solid gels provided a signal-to-noise ratio of 22.8 dB. These data confirm that the add-on nanocomposite electrodes provide much better performance for bioimpedance measurements, including higher pulsatile bioimpedance amplitude, signal-to-noise ratio, and dZ/dt, compared to gel and other electrodes. The better performance results from the combined high ionic and electronic conductivity of the nanocomposite.

In addition to electrode materials, we also investigated the current frequency effect on the bioimpedance signals. We observed the average bioimpedance decreased with increasing frequency from 12.5 kHz to 100 kHz. However, the magnitudes of pulsatile bioimpedance and the derivatives were comparable. This trend follows the changes in the electrical properties of biological tissue with frequency. The bioimpedance waveforms collected at 50 and 100 kHz have slightly more consistently distinguishable peaks than those at lower frequencies. The bioimpedance collected with Ag/AgCl gel electrodes followed a similar trend with changing frequencies but overall had lower average bioimpedance and lower pulsatile and derivative magnitudes than the add-on nanocomposite electrodes.

In addition to bioimpedance measurements, add-on nanocomposite electrodes can be used for other electrophysiological recordings. For demonstration, we measured electromyogram (EMG) signals with add-on electrodes and standard Ag/AgCl gel electrodes and compared the EMG signal quality. A pair of electrodes was placed on the flexor muscles of the forearm and a ground electrode near the elbow to quantify the muscle contract intensity induced by a fixed gripping force. The electrode size and location on the forearm were kept the same. The signal-to-noise ratio was calculated from the rectified voltages during muscle contraction and rest using root-mean-squared (RMS) analysis. The RMS noise with the add-on electrodes is 4.27 µV, lower than that of Ag/AgCl gel electrodes (10.7 µV). The signal-to-noise ratio of EMG signals with add-on electrodes is 14.5 dB, higher than gel electrodes (9.2 dB). When reusing the electrodes for the 10th time, the signal quality of EMG measured with the add-on electrodes remains the same, while the signal-to-noise ratio decreases to 6.8 dB for gel electrodes.

Blood Pressure Quantification

Figure 5C:
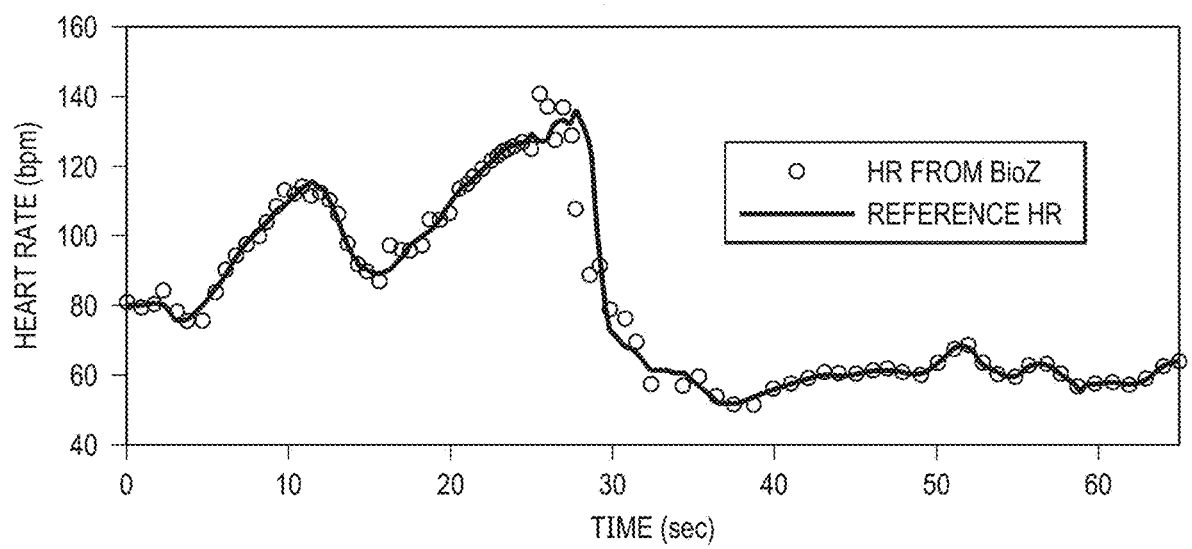
FIG. 5(C) is an overlay graph of heart rate measurements from bioimpedance data and the reference graph.
Figure 5D:
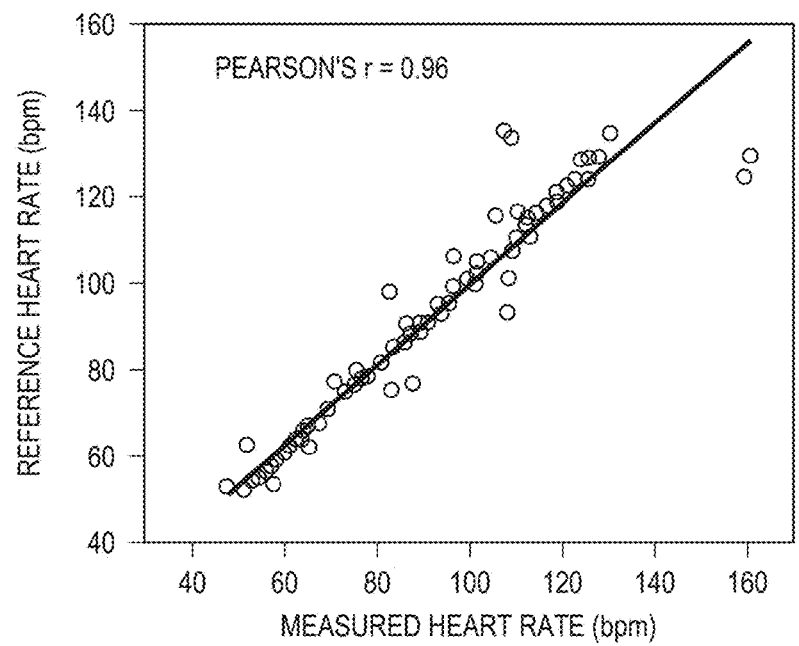
FIG. 5(D) is graph of correlation data ($r^2$=0.92).

As a proof of concept, we demonstrated continuous blood pressure monitoring on a healthy male subject. For blood pressure quantification, the add-on electrodes with a 70% fill factor were used for bioimpedance measurements based on the optimization results above. We simultaneously measured bioimpedance and blood pressure to calibrate the bioimpedance for blood pressure quantification. A medical-grade continuous blood pressure monitoring system (Finapres NOVA) measured SBP and DBP as reference values. Finapres uses a volume-clamping-based finger cuff with an embedded light-emitting diode and photodiode to capture the blood volume change in the finger and continuously derive the BP values in real time. To introduce arterial blood pressure changes, the subject performed a Valsalva maneuver, involving 30 s of exhaling with nostrils and mouth closed and then 35 s of rest. In general, the arterial BP and heart rate changes by the maneuver can diagnose heart problems and autonomic nervous system deficiencies. For the purposes of this study, it was used as a means of varying the BP values. FIG. 5(A) shows one sample set of continuously measured beat-to-beat SBP and DBP with the Finapres. The blood pressures show increased SBP from 120 mmHg to 210 mmHg and DBP from 55 mmHg to 110 mmHg with the increased intrathoracic and intra-abdominal pressure. After releasing the pressure, the SBP and DBP dropped back to initial values within 30 s. The SBP and DBP changes are consistent with the trend induced by a Valsalva maneuver reported in the literature. For convenient visualization and comparison, the simultaneously measured bioimpedance was plotted with reversed magnitudes (FIG. 5(B)). The temporal changes in bioimpedance follow the same trend with the reference SBP and DBP changes. The heart rates quantified with Finapres and bioimpedance are also consistent during and after the Valsalva maneuver (FIG. 5(C)). The heart rate increased from 78 beats per minute (bpm) to 135 bpm and then dropped back to 62 bpm. The correlation plot quantifies the Pearson's correlation coefficient between the Finapres and bioimpedance-measured heart rate to be 0.96 (FIG. 5(D)).

Figure 6A:
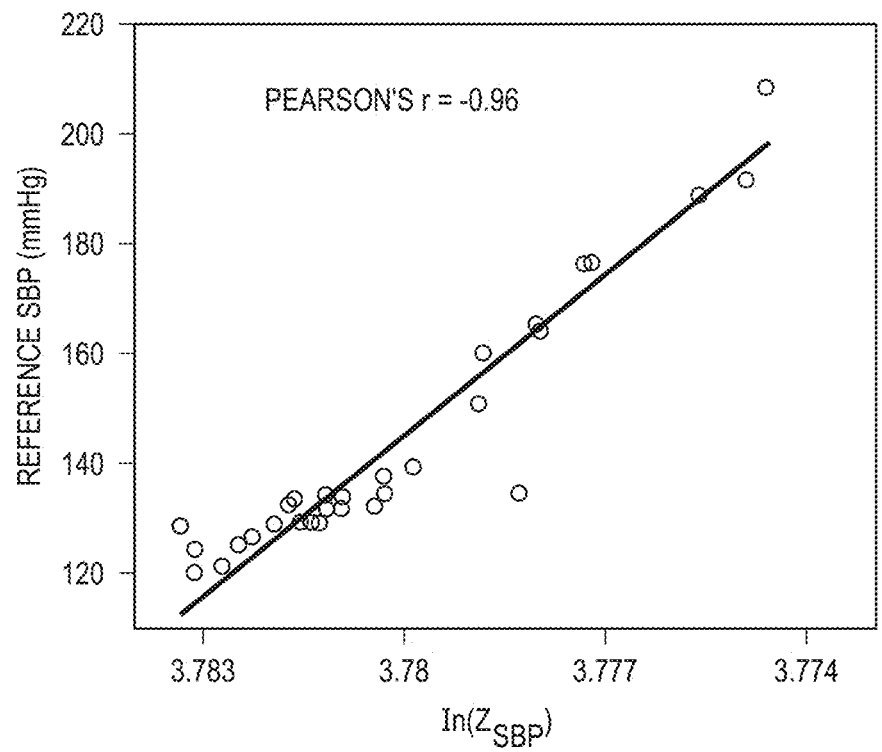
FIGS. 6(A)-6(F) illustrate continuous BP quantification using bioimpedance.
Figure 6B:
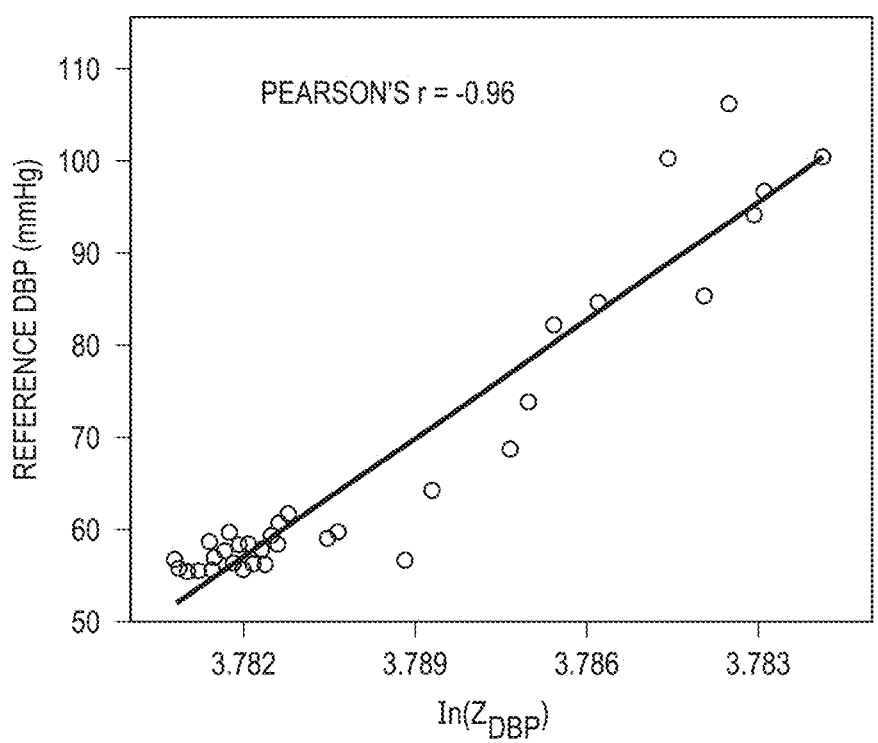
Figure 6C:
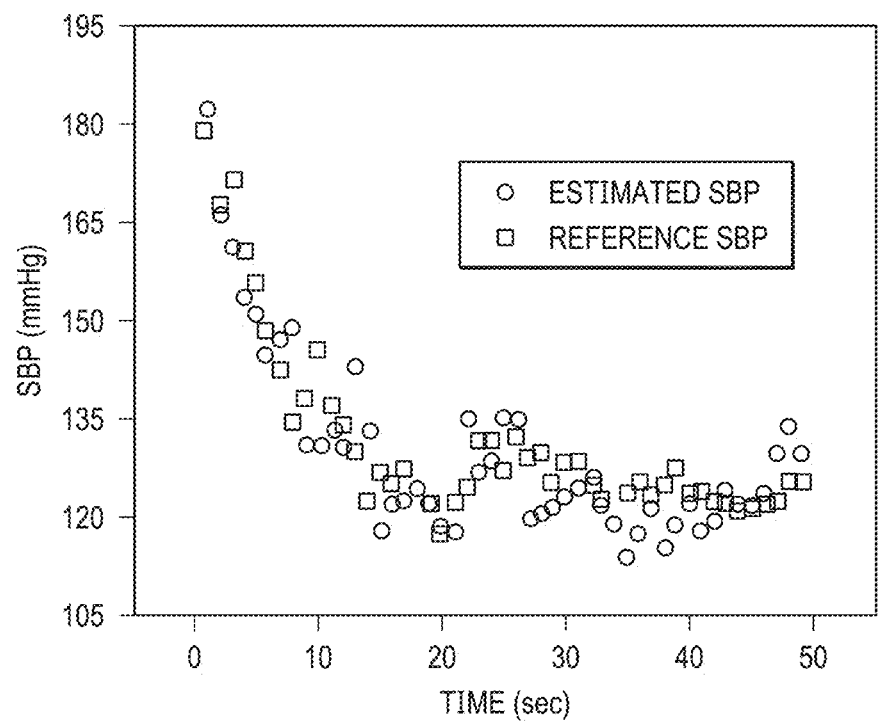
Figure 6D:
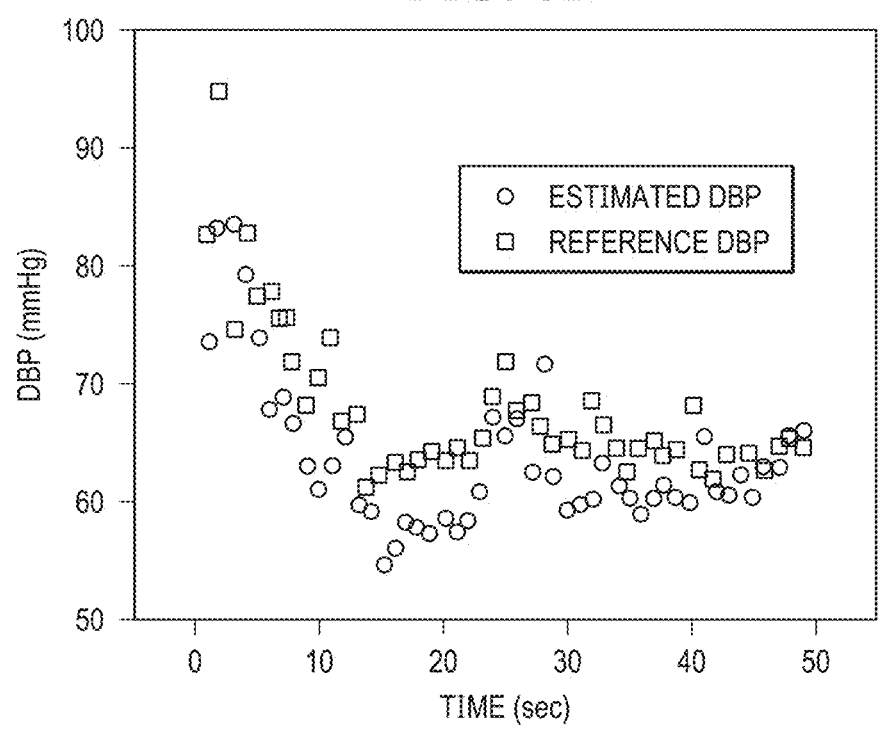
Figure 6E:
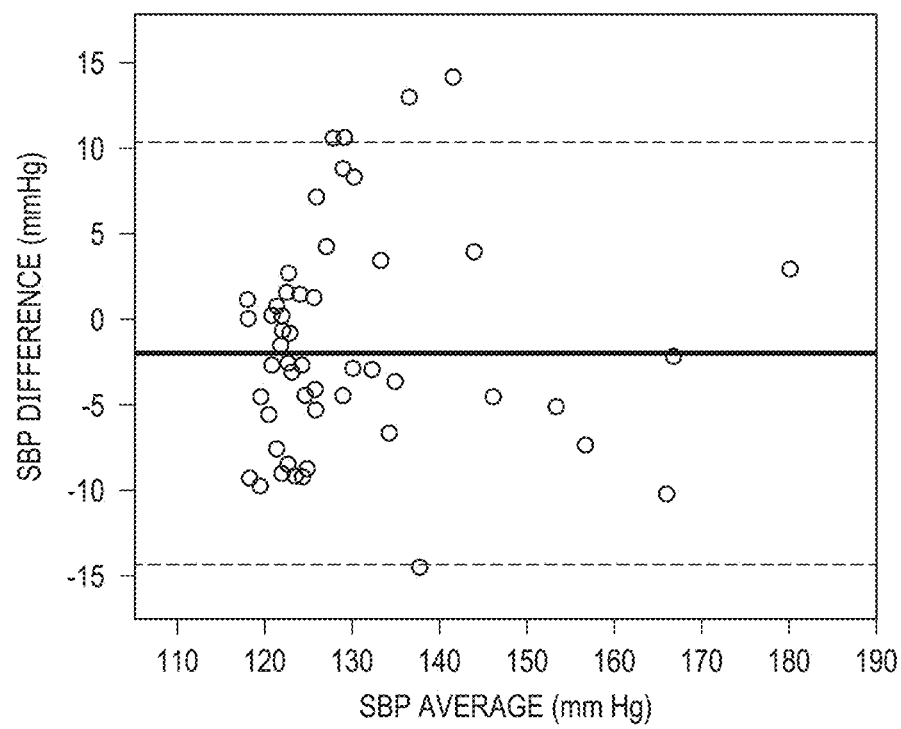
Figure 6F:
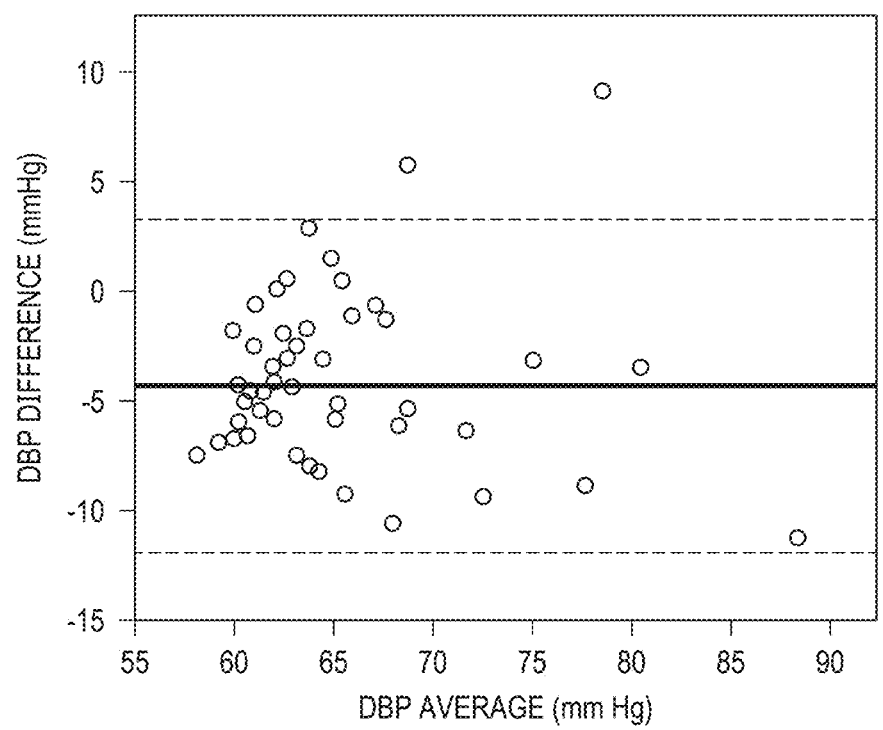

To calibrate bioimpedance for SBP and DBP quantification, we fit the simultaneously collected data using the relationship in Equation 1 below:

$$P(t)=\gamma \ln|Z(t)|+C \quad \text{(Equation 1)}$$

where P represents blood pressure, Z is bioimpedance magnitude, γ is a subject-dependent arterial coefficient, and C is an integration constant. Pearson's correlation coefficient of −0.96 confirms a strong linear relationship between BP and ln|Z(t)| for both SBP (FIG. 6(A) and DBP (FIG. 6(B)). We applied the relationship to examine the accuracy of BP quantification in continuous measurements. The quantified SBP (FIG. 6(C)) and DBP (FIG. 6(D)) using this calibration show consistent values with reference BP measured with Finapres. The Bland-Altman plots show the agreement between reference and bioimpedance quantified BP (FIGS. 6(E), 6(F)). The data collected during the rest phase after the Valsalva maneuver were used for analysis to reduce the standard deviation. The mean absolute error (MAE) of SBP and DBP was calculated to be −2.0±6.3 mmHg and −4.3±3.9 mmHg, respectively, which is classified as grade A based on the IEEE standard for wearable, cuffless blood pressure measuring devices (IEEE 1708-2014). These results show promise in bioimpedance measurements with add-on soft electrodes for cuffless blood pressure monitoring, although with a very small sample set.

Conclusion

We have introduced add-on nanocomposite electrodes to eliminate the wire connection to the rigid surface of back-end circuits for continuous electrophysiological recordings. An ultrathin foldable nanocomposite film forms a mechanically and electrically robust interface to the skin and the back-end circuit. Users can easily apply these low-cost, add-on electrodes without using solder and thermal bonding. The electrophysiological signals, including EMG and bioimpedance, collected with the add-on electrodes exhibit a higher signal-to-noise ratio than the standard gel sensors. The bioimpedance sensors provided cuffless continuous blood pressure monitoring with accuracies of −2.0±6.3 mmHg for SBP and −4.3±3.9 mmHg for DBP. The add-on concept is generalizable to other wearable sensors and actuators to bypass wire connections while offering robust interfaces to soft biological tissues and rigid electronic circuitry.

WORKING EXAMPLES

Materials

Poly(3,4-ethylenedioxythiophene):poly(styrenesulfonate) (CLEVIOS PH 1000) was purchased from Heraeus Epurio LLC. Triton X-100 (2-[4-(2,4,4-trimethylpentan-2-yl)phenoxy]ethanol), ethylene glycol, silver nitrate, polyvinylpyrrolidone (PVP, Mw=59,000), copper chloride, D-sorbitol, and 1H,1H,2H,2Hperfluorooctyltrichlorosilane were purchased from Fisher Scientific. The foam, double-sided adhesives, elastic nonwoven fabric medical tape, and Tegaderm skin adhesives were purchased from 3M. Polydimethylsiloxane (PDMS, Sylgard184) was obtained from Dow Corning. SU-8 and its developer were obtained from Kayaku Advanced Materials, Inc. All chemicals were used as purchased.

Fabrication of Add-on Electrodes

Polydimethylsiloxane (PDMS) mold was fabricated using soft lithography. SU-8 masters with the serpentine pattern were first fabricated on 4-inch silicon wafers using photolithography. The wafer was treated with perfluorooctyltrichlorosilane vapor to reduce the adhesion between SU-8 and PDMS. PDMS precursor solution was poured onto the wafer and cured at 60° C. overnight. Next, the PEDOT:PSS solution filled the channel in the PDMS mold, followed by the removal of excess PEDOT:PSS solution outside of the channel via soft blading and drying at 60° C. to remove solvents. Consequently, the next two layers, AgNW and PEDOT:PSS were processed following the same procedure. Once the coating of all the layers was completed, the electrodes were annealed at 130° C. for 30 min. The fabricated nanocomposite thin films were transferred onto skin adhesives and then folded around soft foam adhesive (7 mm×10 mm) to form add-on electrodes. These electrodes were then applied onto a wearable patch for EMG and bioimpedance measurements. The wearable patch is a printed circuit board that holds Au/Cu pads, where add-on electrodes are placed on.

Bioimpedance Measurements for Blood Pressure Quantification

Bioimpedance signals were measured using the BIOPAC system (MP160 and NICO100C). The wearable patch composed of two pairs of electrodes was placed above the radial artery on the forearm of a healthy human subject to continuously record bioimpedance. The outer current injection electrodes applied a small current of 400 µA with a frequency of 50 kHz, while the inner sensing electrodes measured the voltage at a sampling rate of 10 kHz and converted it to the impedance. The add-on electrodes were applied to the Au/Cu pads of the wearable patch for bioimpedance recordings. Gel electrodes and Au/Cu pads with and without gel of the same dimension were tested following the same configuration. A 10 Hz low-pass and DC high-pass filters were applied to the raw data in post-data processing. Finapres NOVA, a clinical-grade non-invasive continuous blood pressure monitor system, was used for calibration and validation. Using the Finapres, the continuous blood pressure was measured on the subject's middle finger using a finger cuff with an embedded light-emitting diode and photodiode. Simultaneously, bioimpedance was continuously measured while the human subject performed a Valsalva maneuver to vary DBP and SBP and build the correlation between bioimpedance and BPs.

Biopotential Measurements

EMG signals were measured using the BIOPAC system (MP160, AMI100D, and EMG 100D). Bipolar EMG signals were monitored using two electrodes on the forearm and a ground electrode to the elbow to obtain the activity of brachioradialis muscle contractions. The add-on electrodes were applied to the conductive pads of the wearable patch for EMG recordings. Gel electrodes of the same dimension were tested for EMG recordings following the same configuration for comparison.

Contact Pressure Sensor Integrated Bioimpedance Device

Figure 7A:
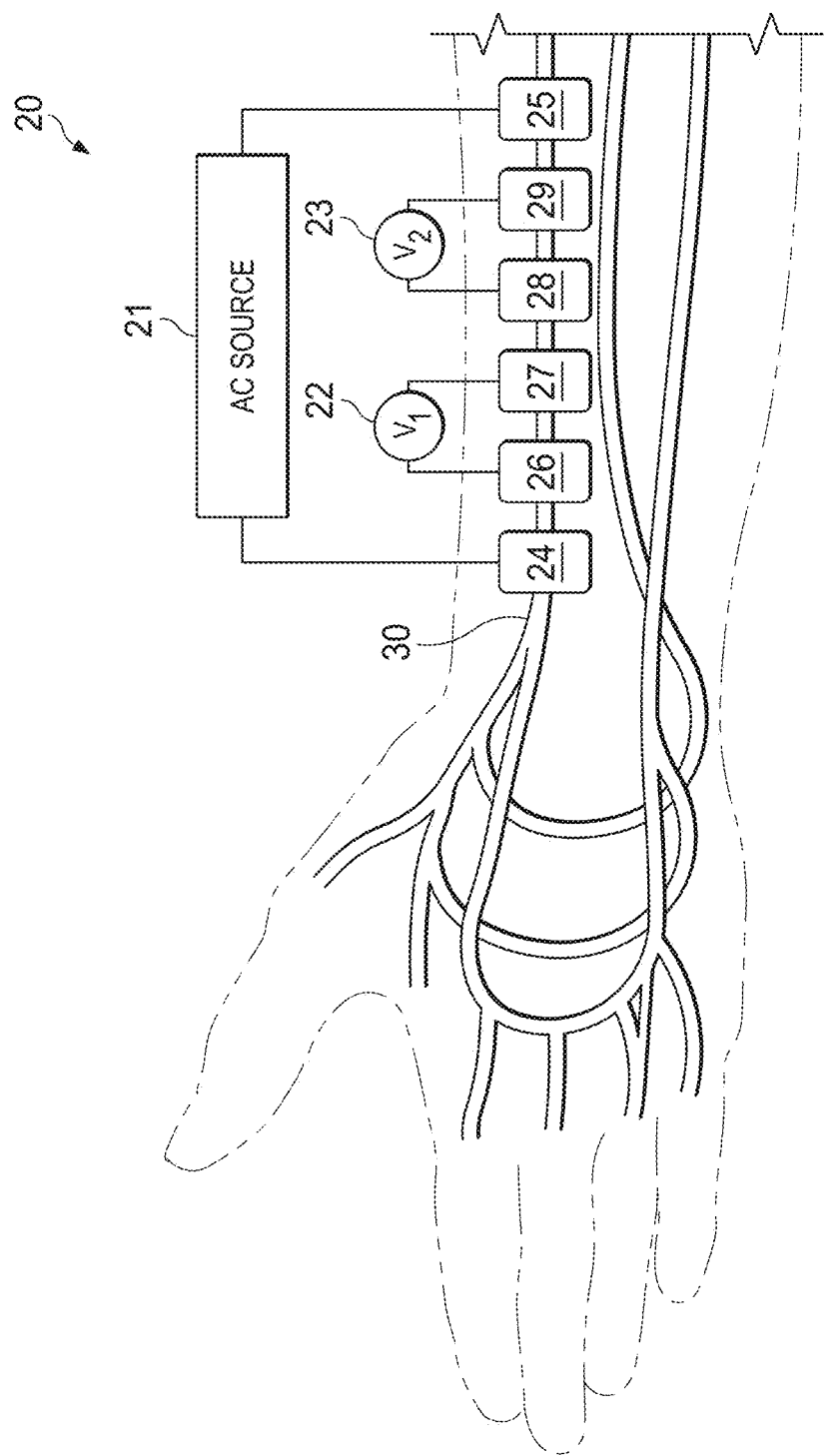
FIG. 7(A) illustrates a dual-channel bioimpedance sensor.
Figure 8B:
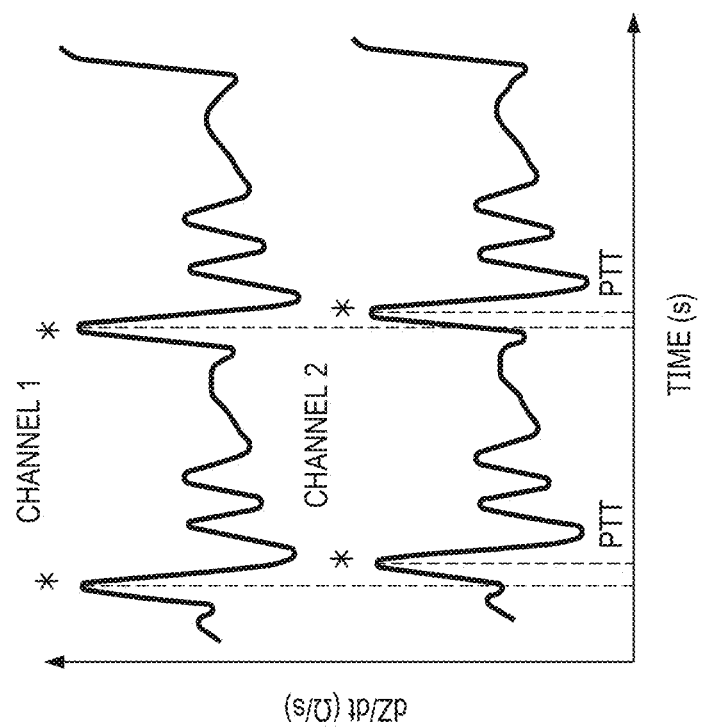
FIGS. 8(A)-8(B) are graphs illustrating a pulse transit time (PTT) calculation from (A) base bioimpedance signals and (B) first time derivative signals of the bioimpedance.
Figure 8A:
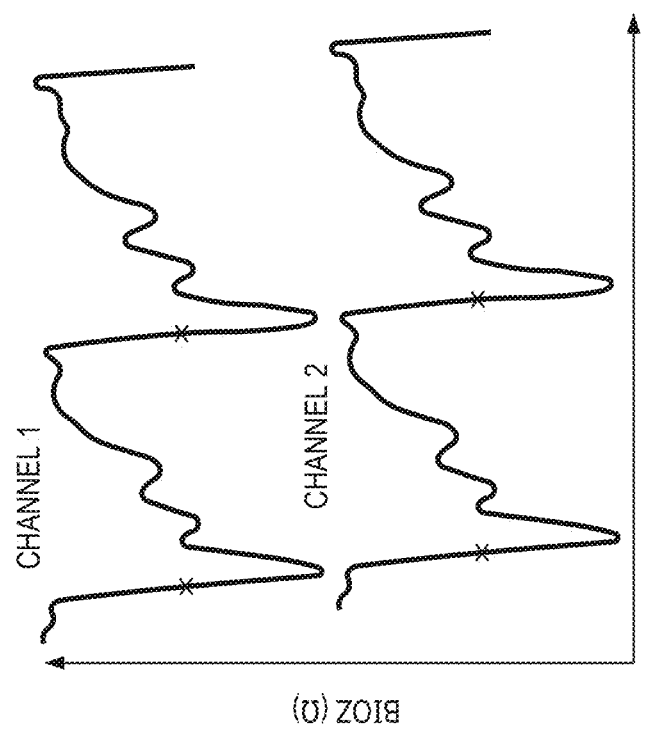

FIG. 7(A) is a schematic of a wearable dual channel bioimpedance device 20 that provides continuous pulse wave velocity quantification and blood pressure. Device 20 includes an AC source 21 and two voltage sensors 22, 23. AC source 21 includes two electrodes 24, 25 that are positioned along a radial artery 30. Voltage sensor 22 includes two electrodes 26, 27 that are positioned between electrodes 24, 25 and along radial artery 30. Voltage sensor 23 includes two electrodes 28, 29 that are positioned between electrodes 24, 25 and along radial artery 30. Electrodes 24, 25 inject a 400 µA alternating current (AC) with frequencies ranging from 12.5 to 100 kHz below the skin surface, and electrodes 26, 27 and 28, 29 measure a resultant voltage change and convert it to impedance values. The three pairs of electrodes 24, 25, 26, 27, 28, 29 align with radial artery 30 on the forearm to maximum the bioimpedance magnitude and signal to noise ratio. The measured bioimpedance consists of steady and pulsatile components (FIG. 8(A)). The steady component measures the bioimpedance of the underlying tissue beneath the voltage electrodes typically in the range of 10-100 ohms. The pulsatile components follow the changes in the localized blood volume during the blood pressure pulse propagation. The pulse transit time (PTT) can be calculated from two channels bioimpedance recorded with a high sampling rate of 10 kHz. For easy calculation, the first derivative was calculated from the bioimpedance and the time difference in the derivative peak defines the PTT (FIG. 8(B)). Combined with the known distance between the two pairs of inner electrodes, the PWV at each pulsatile can be calculated.

Figure 7D:
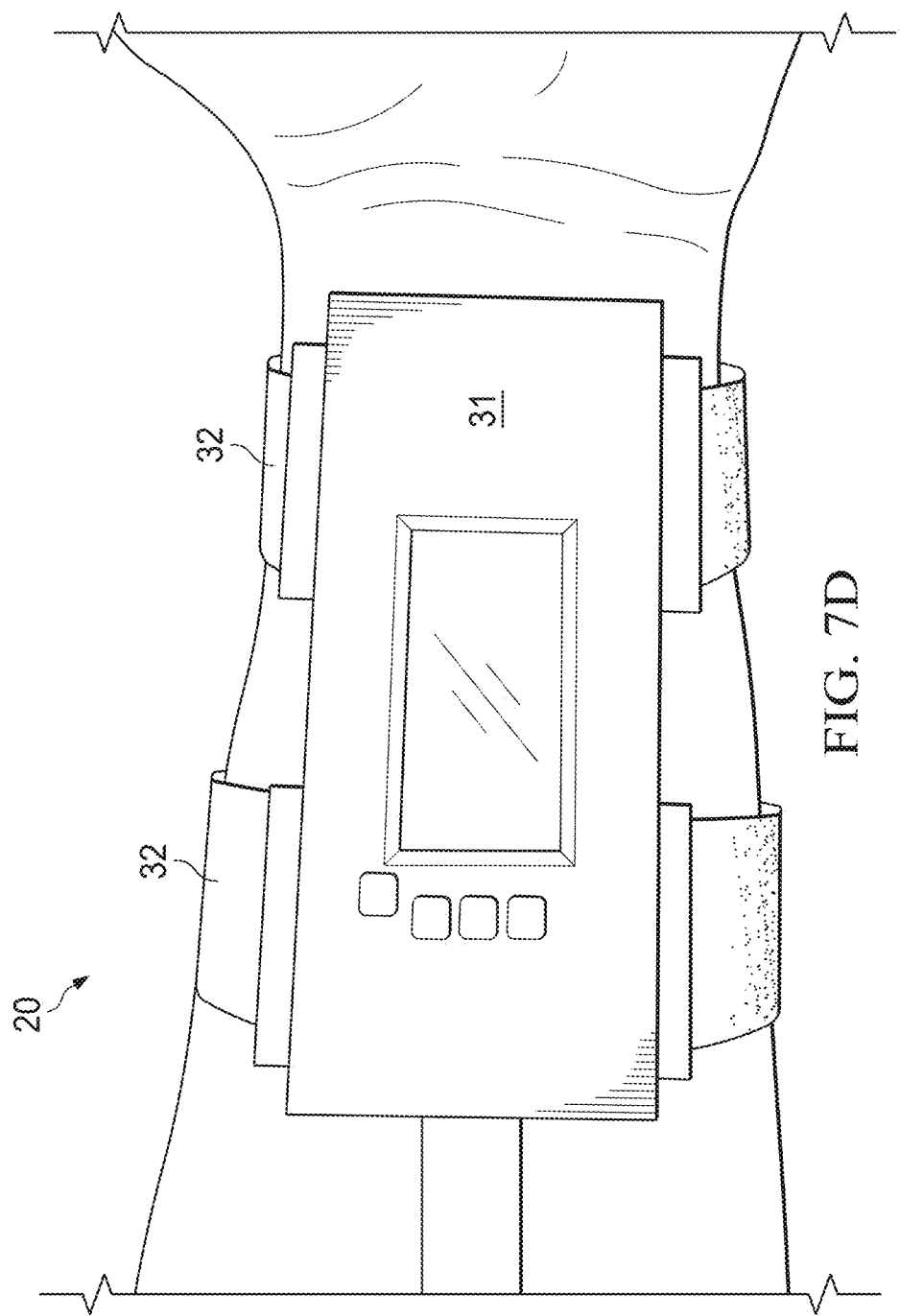
Figure 9:
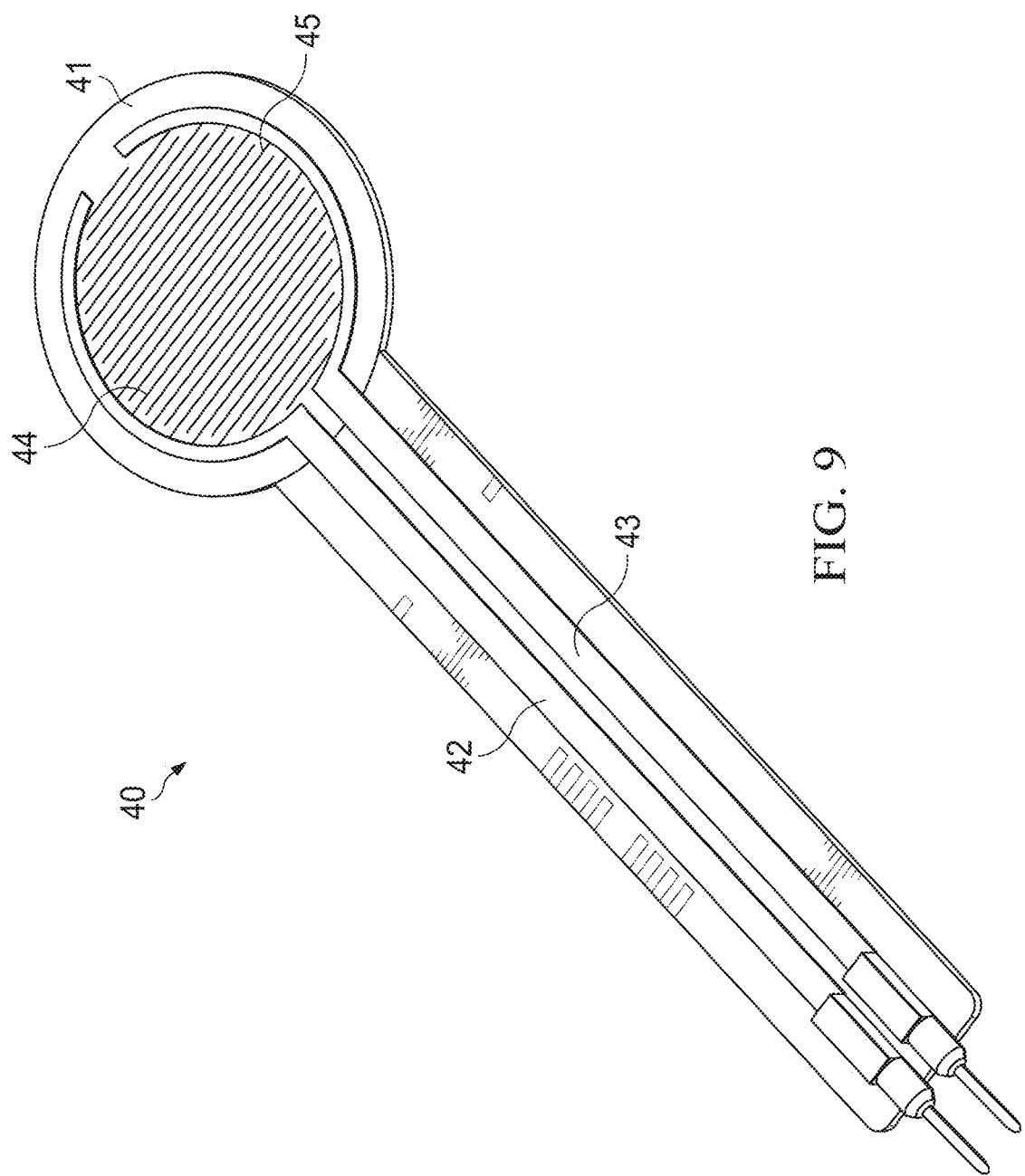
FIG. 9 illustrates a piezoelectric pressure sensor for use with a wearable device.

We integrated a pair of piezoelectric pressure sensors 40 (FIG. 9) into wearable device 20 to quantify the contact pressure between the skin and electrodes and evaluate the effect of the contact pressure on the recorded bioimpedance and corresponding PWV (FIGS. 7(B)-7(D). FIG. 9 illustrates piezoelectric pressure sensor 40 for use with device 20. Sensor 40 includes a sensor body 41. Two leads 42, 43 are coupled to elements 44, 45, respectively. Elements 44, 45 are interleaved, but do not contact one another. The general operation of piezoelectric pressure sensors are generally known and not discussed in detail here. Sensor 40 was optimized to quantify a pressure range from comfortable contact (<7 kPa) to intolerable high pressure (16 kPa). The contact pressure exerted by wearable device 20 can compress the tissues, including the radial artery, which can affect the radial artery diameter, wall tension, and blood flow characteristics. Wearable device 20 quantifies contact pressure in real time. If the pressure is too high, wearable device 20 can display or sound an alert so that straps 32 can be loosened to ensure that accurate data is collected.

The soft foam electrodes were prepared with conductive nanocomposite. These add-on electrodes can provide higher signal to noise ratio in bioimpedance recordings compared to standard gel electrode. The soft foam electrodes are flexible and breathable, and user-friendly (e.g., see FIGS. 1(D) and 1(E)). They can be simply added to a printed circuit board with gold conductive surface to provide conformal contact with the skin while maintaining uniform contact pressure. All the bioimpedance recordings were obtained with the electrodes of 7 mm wide and 10 mm long and the center-to-center spacing of 0.5 cm.

Dual-Channel Bioimpedance with Varying Injection Frequencies

We first investigated the effect of injected AC frequencies on the recorded bioimpedance, including magnitude, waveform and signal quality. Bioimpedance recorded on the forearm typically falls in the frequency range of 10 kHz to 100 kHz to maximize the blood flow response. We recorded dual channel bioimpedance (bioZ) at four frequencies, including 12.5, 25, 50 and 100 kHz and calculated the corresponding first derivative with respect to time (dZ/dt). A high dZ/dt indicates a high bioimpedance signal quality. Bioimpedance was continuously recorded at different frequencies from the site far away from (Ch. 1, electrodes 28, 29) and closer to the wrist (Ch. 2, electrodes 26, 27), respectively. The steady magnitude of Ch. 1 bioZ decreased from 47.1$\Omega$ to 40.9$\Omega$ while Ch. 2 bioZ decreased from 41.7$\Omega$ to 35.5$\Omega$ with increasing frequency from 12.5 to 100 kHz. The higher steady Ch. 1 bioZ mainly results from the higher fat content in the tissue far away from the wrist. The decreased bioZ with increasing frequency follows the changes in the electrical properties of biological tissue with frequency. The dZ/dt for Ch. 1 and Ch. 2 was calculated with reversed polarity. The dZ/dt at 50 and 100 kHz show relatively consistent high magnitudes and distinctive waveforms compared to low frequencies. The magnified waveforms were plotted for easy comparison. The bioimpedance showed higher noise and lower magnitude in dZ/dt with the injection frequencies of 12.5 kHz and 25 kHz. Furthermore, the bioimpedance continuously collected with 100 kHz injection frequency exhibited slightly less baseline drift compared to the 50 kHz data. Therefore, we used 100 kHz injection frequency in the following experiments.

Effect of Contact Pressure

Figure 3C:
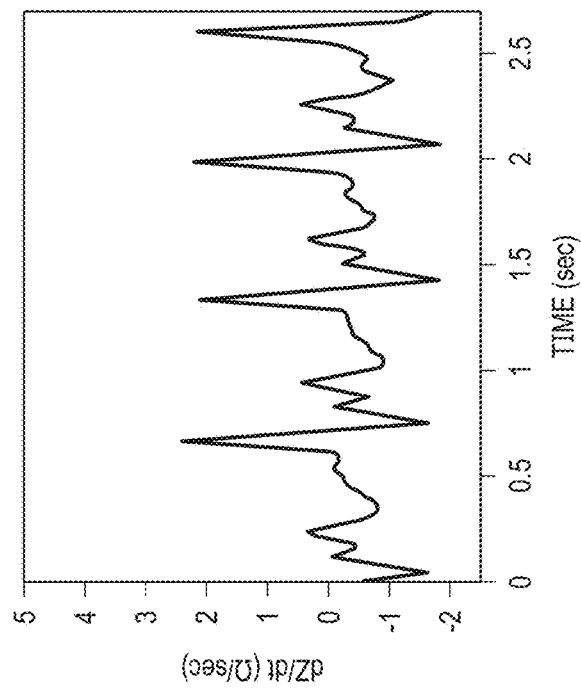
FIGS. 3(B)-3(C) are graphs of base impedance and its first derivative with respect to time of 30% fill factor add-on electrodes.
Figure 3A:
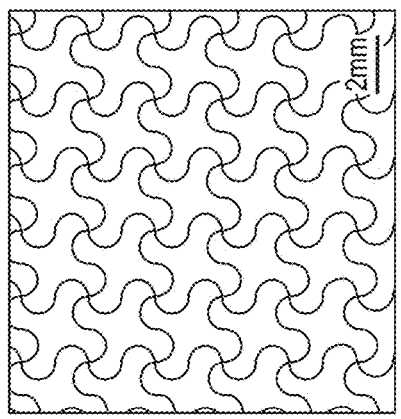
FIGS. 3(A), 3(D), and 3(G) illustrate nanocomposite files at fill factors of 30%, 50%, and 70%, respectively.
Figure 3B:
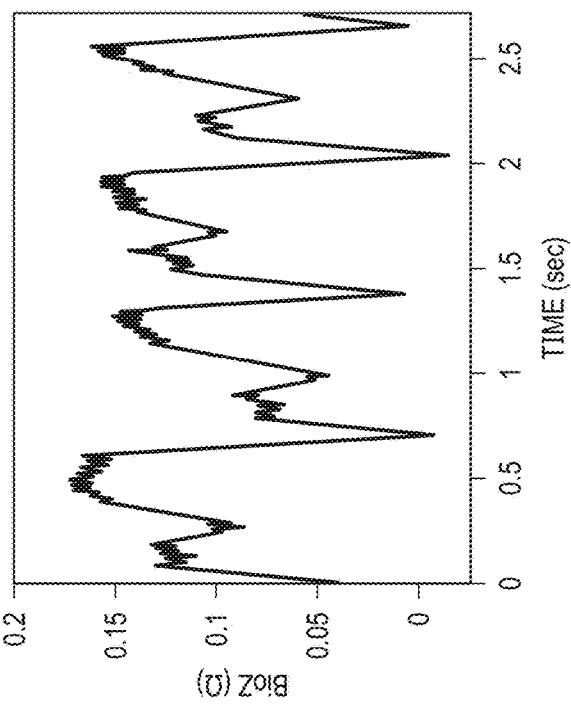
Figure 3F:
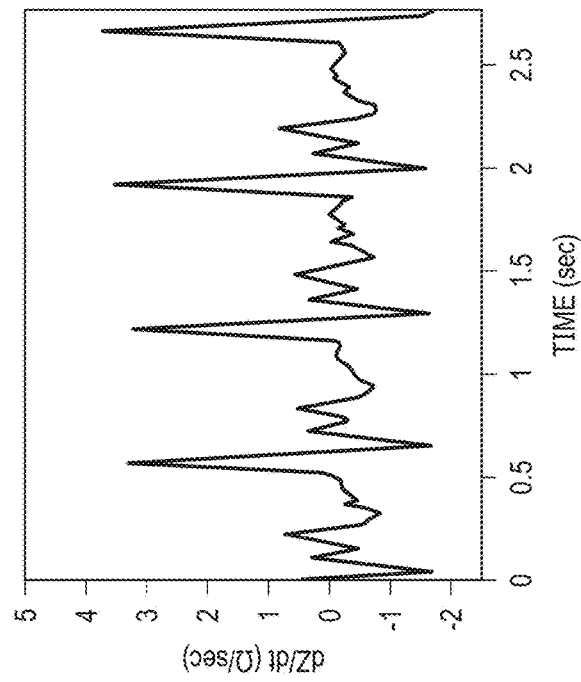
FIGS. 3(E)-3(F) are graphs of base impedance and its first derivative with respect to time of 50% fill factor add-on electrodes.
Figure 3D:
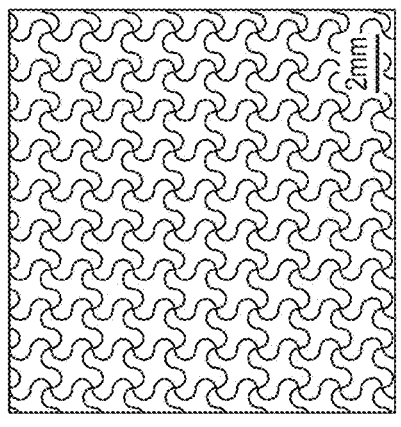
Figure 3E:
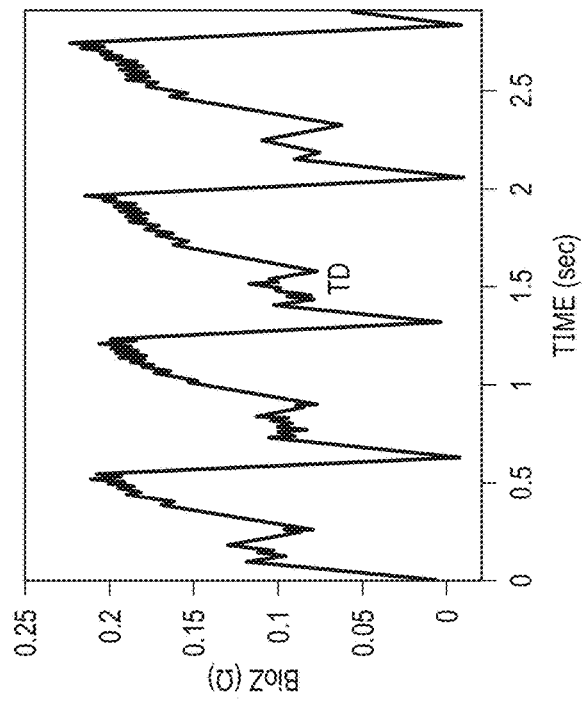
Figure 3I:
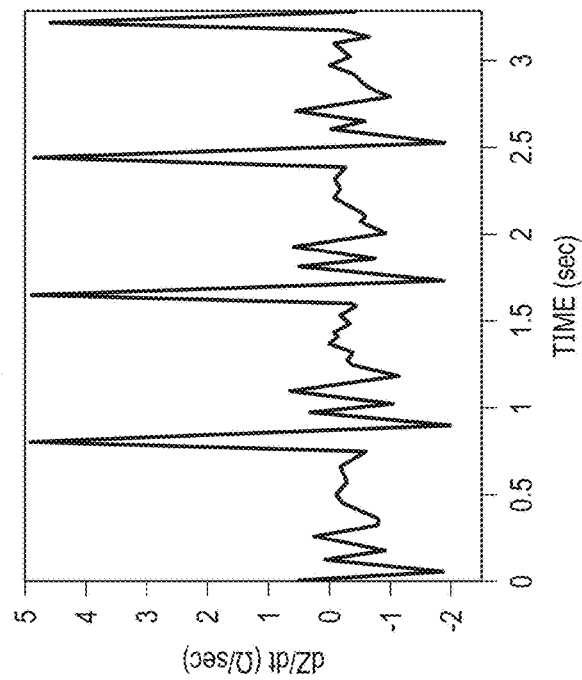
FIGS. 3(H)-3(I) are graphs of base impedance and its first derivative with respect to time of 70% fill factor add-on electrodes
Figure 3G:
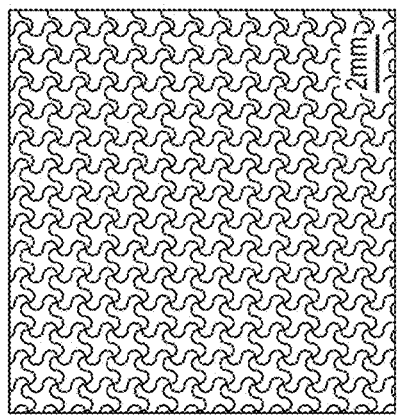
Figure 3H:
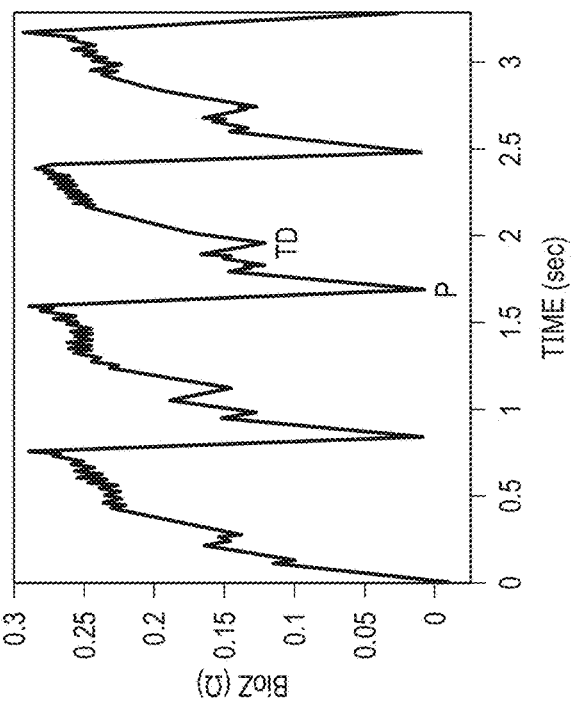

We systematically varied the contact pressure and recorded dual channel bioZ to evaluate the effect of contact pressure on bioZ and localized PWV. FIGS. 3a and 3b show bioZ continuously recorded under the contact pressure stabilized in the range from 1.7 kPa to 15.7 kPa. The steady magnitude of Ch. 1 bioZ increased from 32.0$\Omega$ to 38.5$\Omega$ while Ch. 2 bioZ decreased from 27.8$\Omega$ to 32.8$\Omega$ with increasing the contact pressure and reached plateau at 13.4 kPa. The increasing trend in bioZ likely originated from localized decrease in biofluid volume. The pressure dependent bioZ change in Ch. 1 is higher than that in Ch. 1 due to the higher tissue volume. The Ch. 1 dZ/dt magnitude increased by more than 2 folds from 1.2 $\Omega$/s to 3.0 $\Omega$/s with increasing the contact pressure and reached maximum at the pressure range of 11-13.4 kPa and decreased at a higher pressure. Magnified bioZ waveforms and dZ/dt obtained from channels 1 and 2 at the contact pressure of 6.4 kPa were also observed. The contact pressure that maximized the pulsatile bioZ magnitude is close to the mean BP of the subject. The Ch. 2 dZ/dt shows a similar trend but much smaller changes with the increasing contact pressure as the Ch.2 site near the wrist has significantly less adipose tissues compared to the Ch. 1 site far away from the wrist. These data suggests that the bioZ collected from the regions with high soft tissue volume is more sensitive to the contact pressure. Using dual channel dZ/dt, we calculated PTT and PWV under changing contact pressure while sitting, lying down, and standing. The PWV value quantified in sitting position increased from 3.1±0.7 m/s to 4.1±0.8 m/s with increasing the contact pressure from 1.7 kPa to 6.4 kPa, then decreased to 2.6±0.3 m/s at the high contact pressure of 15.7 kPa. The PWV quantified in lying down position showed a similar trend but slightly lower values compared to those in sitting position. The carotid-femoral PWV in lying down position is typically used to measure arterial stiffness. Previous studies show that the carotid-femoral PWV in sitting is slightly lower than that in lying down position, indicating resting arterial stiffness is higher in sitting position. Our observation suggests localized PWV can also be used to estimate arterial stiffness.

PWV and BP Correlation

Next, we simultaneously and continuously recorded dual channel bioZ and BP on the different forearms of a healthy human subject to establish the relationship between PWV and BP. The PWV was quantified under the constant contact pressure of 6.4 kPa within the comfortable range for long-term wear. A medical-grade continuous blood pressure monitoring device (Finapres NOVA) was used to measure the reference systolic and diastolic blood pressures (SBP and DBP, respectively) and mean arterial pressure (MAP) was calculated with a calculated with a standard formula (SF) using Equation 2 below:

$$MBP=DBP+\tfrac{1}{3}(SBP-DBP) \qquad \text{(Equation 2)}$$

Finapres device employs volume clamping finger cuff along with PPG technique to obtain the blood volume change in the extremity to continuously monitor the BP values in real time. Simultaneously with Finapres, the PWV values were calculated via dual bioimpedance and dZ/dt. To induce arterial blood pressure changes, the subject performed repetitions of vertical leg raises (for 1 min followed by 2 min of rest) while lying down. In general, intensive anaerobic exercises are known to increase the bioelectrical impedance values. Bioimpedance signals from Ch. 1 and Ch. 2 sites on the wrist during rest (R) and exercise (E) were collected. The steady magnitude of bioimpedance quickly drops as the subject exercises and jumps back up as soon as the subject comes to the rest state, and then decreased gradually. The calculated dZ/dt is around 2 $\Omega$/s with relatively higher fluctuation during exercise than rest periods. It is known that blood pressure increases during physical activities. The decrease in bioZ during exercise reflect increase in BP in agreement with previous studies. Slight changes in the skin-electrode interface impedance coupled with temporary skin tissue deformation could cause bioZ magnitude to fluctuate, making blood pressure calibration using steady bioZ less reliable in long-term measurements.

We used the dual channel dZ/dt to calculate the pulse wave velocity to correlate with BP for improved stability. The PWV increased to 10 m/s during the exercise and came back to the baseline during the rest period. During exercise, the cardiac output must increase to deliver more oxygen to meet metabolic requirements of the working muscles, which is accompanied by moderate elevation in mean BP and pulse pressures in healthy subjects. As expected, the blood pressure elevations were observed during exercise. The blood pressure shows increased SBP from 95 mmHg to 175 mmHg, DBP from 55 mmHg to 105 mmHg, and MAP from 65 mmHg to 120 mmHg with the vertical leg raises exercise protocol. After returning to the rest posture, the blood pressures fell almost immediately back to the baseline established in the initial rest period. The changes in the systolic and diastolic blood pressures and mean arterial pressure showed consistent trend in the PWV changes.

Based on these findings, a linear regression analysis was performed to calibrate the relationship between PWV and BP. The beat-to-beat correlation yielded the low Pearson's correlation coefficients, potentially because the simultaneous recordings were performed on the different arms. Therefore, all the data were averaged over 15 seconds to enhance the fitting quality, which yielded the Pearson's correlation coefficients of 0.9, 0.87, and 0.81 for SBP, DBP, and MAP, respectively. We applied the relationship to examine the accuracy of using PWV for BP quantification in continuous measurements. The calibration curve was used to quantify SBP, DBP, and MAP with PWV collected in another exercise session and compared with the reference BP values quantified with Finapres. The Bland-Altman plots show the agreement between reference and bioimpedance derived BP. The mean absolute error (MAE) and standard deviation of the error (SD) of SBP, DBP, and MAP are 0.1±3.3 mmHg, 1.3±3.7 mmHg, and −0.4±3.0 mmHg, which falls under grade A classification according to the IEEE standard for wearable, cuffless blood pressure measuring devices. To further test adaptability of this calibration curve, we performed the same experiment in sitting position. We were able to obtain similar, reasonable correlation coefficients of 0.84, 0.85, and 0.88 for SBP, DBP, and MAP, respectively. For BP quantification in the sitting position, the MAE and SD of SBP, DBP, and MAP are −1.2±3.0 mmHg, −1.6±4.1 mmHg, and −2.4±3.9 mmHg. These results confirm that continuous BP quantification can be achieved by using the linear relationship between BP and PWV, established in different postures.

Conclusion

The skin-interface device with dual channel bioimpedance provides precise quantification of PWV along the radial arterial, which shows linear correlation with continuously measured BP. The embedded piezoelectric pressure sensors allow fundamental studies on the effect of contact pressure on the bioimpedance and PWV. The findings suggest that changes on the contact pressure will affect the PWV and thereby their use in accurate, continuous quantification of BP. With the constantly maintained contact pressure, the bioimpedance device provided the accuracy of 0.1±3.3 mmHg for SBP, 1.3±3.7 mmHg for DBP, and −0.4±3.0 mmHg for MAP when the measurements were performed in lying down position. Similar accuracy was also achieved for the sitting position. These results collectively confirmed the potential of the bioimpedance device for continuous BP monitoring. It also highlights the importance of stable contact pressure in the operation of wearable electronic devices. In our future studies, skin-like multichannel bioimpedance sensors will be developed and tested for continuous BP monitoring, a promising tool for management of cardiovascular health.

Device Design

Figure 10:
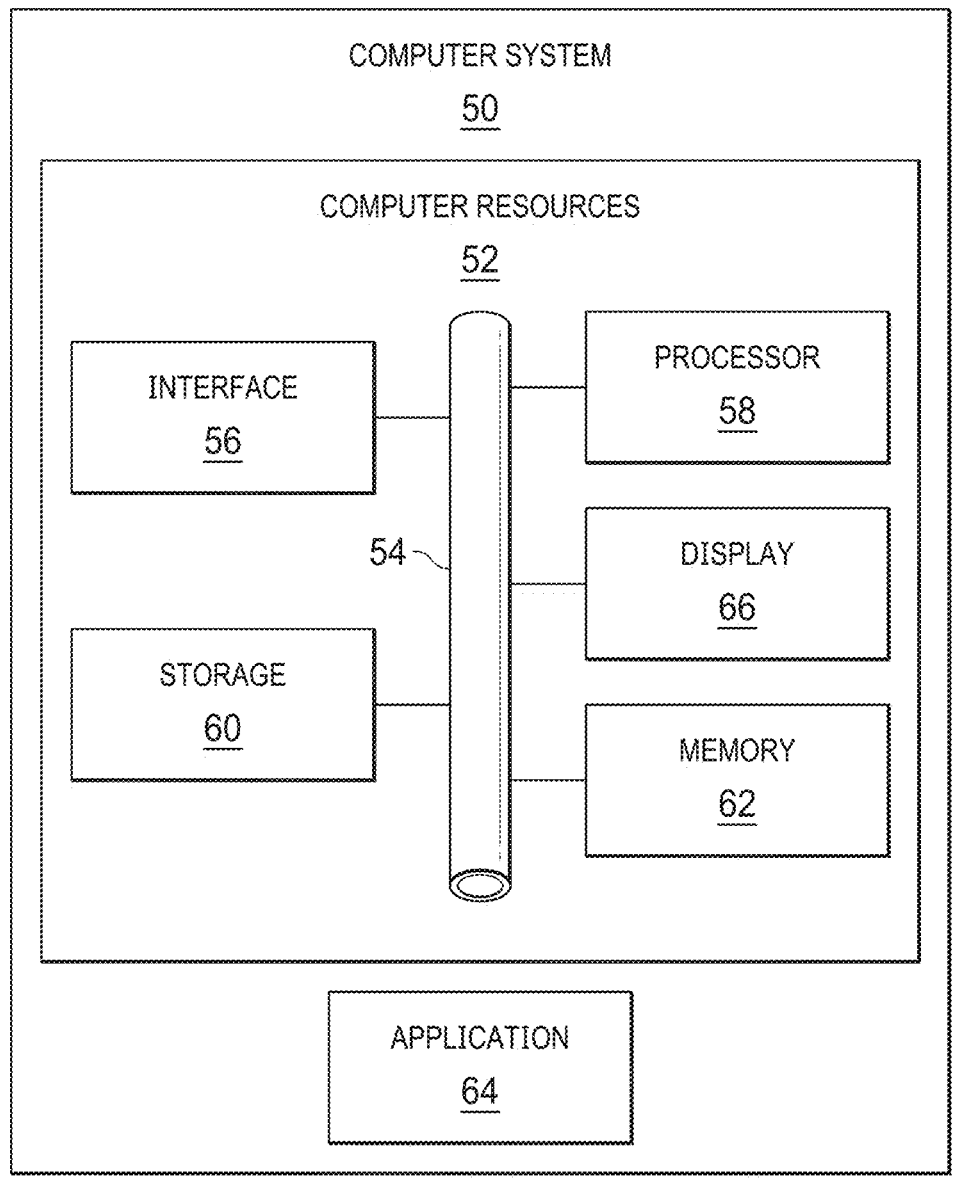
FIG. 10 illustrates a computer system for a wearable device.

FIG. 10 illustrates an example of a computer system 50 that, in some cases, can be representative, for example, of a computer and control system for wearable devices (e.g., devices 10 and 20 discussed above) for monitoring blood pressure described herein. Computer system 50 includes an application 64 operable to execute on computer resources 52. Application 64 can be, for example, an interface for operating computer system 50. In other embodiments, application 64 can be, for example, an interface for operating and/or accessing all engines and datastores of computer system 50. In particular embodiments, computer system 50 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of computer system 50 may comprise any suitable physical form, configuration, number, type and/or layout. As an example, and not by way of limitation, computer system 50 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, computer system 50 may include one or more computer systems; be unitary or distributed; span multiple locations; span multiple machines; or reside in a cloud, which may include one or more cloud components in one or more networks.

In the depicted embodiment, computer system 50 includes a processor 58, memory 62, storage 60, a display 66, interface 56, and bus 54. Although a particular computer system is depicted having a particular number of particular components in a particular arrangement, this disclosure contemplates any suitable computer system having any suitable number of any suitable components in any suitable arrangement.

Processor 58 may be a microprocessor, controller, or any other suitable computing device, resource, or combination of hardware, software and/or encoded logic operable to execute, either alone or in conjunction with other components, (e.g., memory 62), the application 64. Such functionality may include providing various features discussed herein. In particular embodiments, processor 58 may include hardware for executing instructions, such as those making up the application 64. As an example, and not by way of limitation, to execute instructions, processor 58 may retrieve (or fetch) instructions from an internal register, an internal cache, memory 62, or storage 60; decode and execute them; and then write one or more results to an internal register, an internal cache, memory 62, or storage 60. Display 66 is configured to display information to a user (e.g., route guidance information). In some aspects, display 66 may be a touchscreen display that receives input from a user (e.g., origin and our destination information). In some aspects, display 66 may be integrated into computer system 50 (i.e., when computer system 50 is a mobile, stand-alone unit). In some aspects, display 66 may be integrated into a wearable device (i.e., as shown in FIG. 8(D)).

In particular embodiments, processor 58 may include one or more internal caches for data, instructions, or addresses. This disclosure contemplates processor 58 including any suitable number of any suitable internal caches, where appropriate. As an example, and not by way of limitation, processor 58 may include one or more instruction caches, one or more data caches, and one or more translation lookaside buffers (TLBs). Instructions in the instruction caches may be copies of instructions in memory 62 or storage 60 and the instruction caches may speed up retrieval of those instructions by processor 58. Data in the data caches may be copies of data in memory 62 or storage 60 for instructions executing at processor 58 to operate on; the results of previous instructions executed at processor 58 for access by subsequent instructions executing at processor 58, or for writing to memory 62, or storage 60; or other suitable data. The data caches may speed up read or write operations by processor 58. The TLB s may speed up virtual-address translations for processor 58. In particular embodiments, processor 58 may include one or more internal registers for data, instructions, or addresses. Depending on the embodiment, processor 58 may include any suitable number of any suitable internal registers, where appropriate. Where appropriate, processor 58 may include one or more arithmetic logic units (ALUs); be a multi-core processor; include one or more processors 58; or any other suitable processor.

Memory 62 may be any form of volatile or non-volatile memory including, without limitation, magnetic media, optical media, random access memory (RAM), read-only memory (ROM), flash memory, removable media, or any other suitable local or remote memory component or components. In particular embodiments, memory 62 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 62 may include one or more memories 62, where appropriate. Memory 62 may store any suitable data or information utilized by computer system 50, including software embedded in a computer readable medium, and/or encoded logic incorporated in hardware or otherwise stored (e.g., firmware). In particular embodiments, memory 62 may include main memory for storing instructions for processor 58 to execute or data for processor 58 to operate on. In particular embodiments, one or more memory management units (MMUs) may reside between processor 58 and memory 62 and facilitate accesses to memory 62 requested by processor 58.

As an example, and not by way of limitation, computer system 50 may load instructions from storage 60 or another source (such as, for example, another computer system) to memory 62. Processor 58 may then load the instructions from memory 62 to an internal register or internal cache. To execute the instructions, processor 58 may retrieve the instructions from the internal register or internal cache and decode them. During or after execution of the instructions, processor 58 may write one or more results (which may be intermediate or final results) to the internal register or internal cache. Processor 58 may then write one or more of those results to memory 62. In particular embodiments, processor 58 may execute only instructions in one or more internal registers or internal caches or in memory 62 (as opposed to storage 60 or elsewhere) and may operate only on data in one or more internal registers or internal caches or in memory 62 (as opposed to storage 60 or elsewhere).

In particular embodiments, storage 60 may include mass storage for data or instructions. As an example, and not by way of limitation, storage 60 may include a hard disk drive (HDD), a floppy disk drive, flash memory, an optical disc, a magneto-optical disc, magnetic tape, or a Universal Serial Bus (USB) drive or a combination of two or more of these. Storage 60 may include removable or non-removable (or fixed) media, where appropriate. Storage 60 may be internal or external to computer system 50, where appropriate. In particular embodiments, storage 60 may be non-volatile, solid-state memory. In particular embodiments, storage 60 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 60 may take any suitable physical form and may comprise any suitable number or type of storage. Storage 60 may include one or more storage control units facilitating communication between processor 58 and storage 60, where appropriate.

In particular embodiments, interface 56 may include hardware, encoded software, or both providing one or more interfaces for communication (such as, for example, packet-based communication) among any networks, any network devices, and/or any other computer systems. As an example, and not by way of limitation, communication interface 56 may include a network interface controller (NIC) or network adapter for communicating with an Ethernet or other wire-based network and/or a wireless NIC (WNIC) or wireless adapter for communicating with a wireless network.

Depending on the embodiment, interface 56 may be any type of interface suitable for any type of network for which computer system 50 is used. As an example, and not by way of limitation, computer system 50 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 50 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. computer system 50 may include any suitable interface 56 for any one or more of these networks, where appropriate.

In some embodiments, interface 56 may include one or more interfaces for one or more I/O devices. One or more of these I/O devices may enable communication between a person and computer system 50. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 56 for them. Where appropriate, interface 56 may include one or more drivers enabling processor 58 to drive one or more of these I/O devices. Interface 56 may include one or more interfaces 56, where appropriate.

Bus 54 may include any combination of hardware, software embedded in a computer readable medium, and/or encoded logic incorporated in hardware or otherwise stored (e.g., firmware) to couple components of computer system 50 to each other. As an example and not by way of limitation, bus 54 may include an Accelerated Graphics Port (AGP) or other graphics bus, an Enhanced Industry Standard Architecture (EISA) bus, a front-side bus (FSB), a HYPER- TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 54 may include any number, type, and/or configuration of buses 54, where appropriate. In particular embodiments, one or more buses 54 (which may each include an address bus and a data bus) may couple processor 58 to memory 62. Bus 54 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 58 (such as, for example, one or more internal registers or caches), one or more portions of memory 62, one or more portions of storage 60, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can", "might", "may", "e.g.", and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A flexible electrode, comprising:
   a layer of an interpenetrating network of silver nanowires and poly(3,4-ethylenedioxythiophene):poly(styrenesulfonate) (PEDOT:PSS); and
   a core comprising a foam,
   wherein the layer of interpenetrating network of silver nanowires and PEDOT:PSS are wrapped around the core.

2. The flexible electrode of claim 1, wherein a fill factor of the flexible electrode is between about 65-75%.

3. The flexible electrode of claim 1, wherein a fill factor of the flexible electrode is greater than 50%.

4. The flexible electrode of claim 1, wherein the water vapor transmission rate (WVTR) is about 15-17 $gm^{-2}h^{-1}$.

5. The flexible electrode of claim 1, wherein the layer of interpenetrating network of silver nanowires and PEDOT:PSS is adhered to the core via an adhesive.

6. The flexible electrode of claim 1, wherein the foam has a Young's modulus of about 1.5-1.7 kPa.

7. The flexible electrode of claim 1, wherein the foam has a Young's modulus of less than 1 MPa.

8. The flexible electrode of claim 1, wherein the foam is styrene butadiene rubber (SBS).

9. The flexible electrode of claim 1, wherein the PEDOT:PSS comprises 2-[4-(2,4,4-trimethylpentan-2-yl)phenoxy]ethanol and D-sorbitol.

10. The flexible electrode of claim 1, wherein the electrodes are reusable.

11. A wearable device comprising:
    a current source comprising first and second electrodes; and
    a first voltage sensor comprising third and fourth electrodes that are arranged between the first and second electrodes,
    wherein at least one electrode of the first, second, third, and fourth electrodes is a flexible electrode comprising:
      a layer of an interpenetrating network of silver nanowires and poly(3,4-ethylenedioxythiophene):poly(styrenesulfonate) (PEDOT:PSS); and
      a core comprising a foam,
      wherein the layer of interpenetrating network of silver nanowires and PEDOT:PSS are wrapped around the core.

12. The wearable device of claim 11, wherein the current source is configured to inject alternating current into a radial artery via the first and second electrodes.

13. The wearable device of claim 12, where the alternating current is between about 350 and 450 µA at a frequency between about 45-55 kHz.

14. The wearable device of claim 11, wherein the wearable device is configured to measure voltage via the third and fourth electrodes and convert the voltage into impedance.

15. The wearable device of claim 14, wherein the wearable device is configured to quantify blood pressure using the impedance.

16. The wearable device of claim 11, further comprising a pressure sensor configured to measure pressure exerted by the wearable device upon a wrist of a wearer.

17. The wearable device of claim 16, wherein the pressure sensor is a piezoelectric pressure sensor.

18. The wearable device of claim 16, wherein the foam has a Young's modulus of less than 1 MPa.

19. The wearable device of claim 16, wherein the wearable device measures the pressure in real time.

20. The wearable device of claim 11, further comprising a second voltage sensor comprising fifth and sixth electrodes that are arranged between the first and second electrodes, wherein the fifth and sixth electrodes are flexible electrodes.

* * * * *